(12) United States Patent
Kato

(10) Patent No.: US 7,441,152 B2
(45) Date of Patent: Oct. 21, 2008

(54) FAILURE RECOVERY APPARATUS, FAILURE RECOVERY METHOD, MANAGER, AND PROGRAM

(75) Inventor: Kiyoshi Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 567 days.

(21) Appl. No.: 11/141,398

(22) Filed: Jun. 1, 2005

(65) Prior Publication Data

US 2005/0283638 A1 Dec. 22, 2005

(30) Foreign Application Priority Data

Jun. 2, 2004 (JP) ............... 2004-164184

(51) Int. Cl.
*G06F 11/00* (2006.01)
(52) U.S. Cl. ...................................... 714/26
(58) Field of Classification Search .................. 714/26; 706/46, 47
See application file for complete search history.

(56) References Cited

U.S. PATENT DOCUMENTS

| | | | |
|---|---|---|---|
| 5,107,500 A * | 4/1992 | Wakamoto et al. ............ 714/26 |
| 5,404,503 A * | 4/1995 | Hill et al. ..................... 714/31 |
| 5,899,985 A * | 5/1999 | Tanaka ......................... 706/45 |
| 6,411,947 B1 * | 6/2002 | Rice et al. ..................... 706/47 |
| 6,681,344 B1 * | 1/2004 | Andrew ......................... 714/38 |
| 6,738,928 B1 * | 5/2004 | Brown .......................... 714/26 |
| 7,100,085 B2 * | 8/2006 | Miller .......................... 714/26 |
| 7,209,860 B2 * | 4/2007 | Trsar et al. ................... 702/183 |

FOREIGN PATENT DOCUMENTS

| | | |
|---|---|---|
| JP | 7-054474 | 6/1995 |
| JP | 8-221295 | 8/1996 |

* cited by examiner

*Primary Examiner*—Marc Duncan
(74) *Attorney, Agent, or Firm*—Foley & Lardner LLP

(57) ABSTRACT

The failure knowledge storage 5 stores failure knowledge information describing countermeasure command selection information, of which a diversion to a failure other than failures described in a failure countermeasure rule in the rule storage 2 can be surmised. When the failure occurring in the service executor 11 matches the failure described in the failure countermeasure rule, the countermeasure retriever 3 executes the countermeasure command in the failure countermeasure rule on the service executor 11. It is decided whether or not a failure other than the failures described in the failure countermeasure rule matches a failure described in the failure knowledge information in the failure knowledge storage 5. When there is a match, the countermeasure command is read out of the rule storage 2 based on the selection information of the matched failure knowledge information and is executed on the service executor 11.

29 Claims, 11 Drawing Sheets

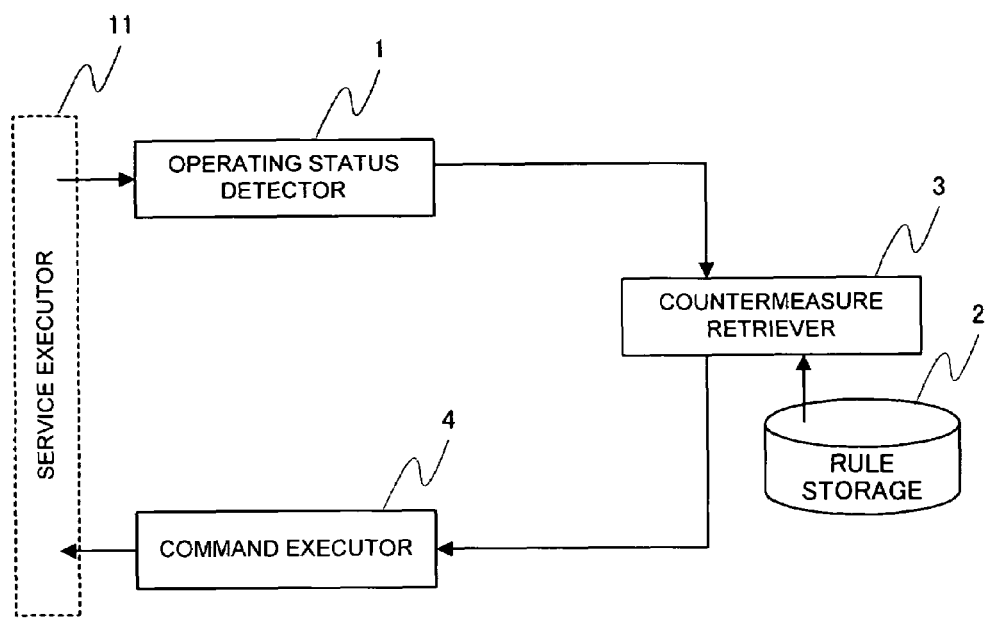

| NUMBER | FAILURE STATE | COUNTERMEASURE COMMAND SELECTION INFORMATION |
|--------|---------------|----------------------------------------------|
| 1 | AP ERROR | MEMORY REMAINING AMOUNT |
| 2 | AP ERROR | CPU LOAD |
| ⋮ | ⋮ | ⋮ |

| NUMBER | CONDITIONAL EXPRESSION | COUNTERMEASURE COMMAND | PRIORITY |
|---|---|---|---|
| 1 | MEMORY REMAINING AMOUNT < 20 | AP REBOOT | 80 |
| 2 | MEMORY REMAINING AMOUNT < 20 | OS REBOOT | 50 |
| 3 | CPU LOAD > 80 | OS REBOOT | 70 |
| 4 | CPU LOAD > 80 | ADDITION OF MACHINE | 40 |
| 5 | AP ERROR | AP REBOOT | 50 |
| ⋮ | ⋮ | ⋮ | ⋮ |
| n | | | |

| NUMBER | CONDITIONAL EXPRESSION | COUNTERMEASURE COMMAND | PRIORITY |
|---|---|---|---|
| 1 | MEMORY REMAINING AMOUNT < 20 | AP REBOOT | 80 |
| 2 | MEMORY REMAINING AMOUNT < 20 | OS REBOOT | 50 |
| 3 | CPU LOAD > 80 | OS REBOOT | 70 |
| 4 | CPU LOAD > 80 | ADDITION OF MACHINE | 40 |
| 5 | AP ERROR | AP REBOOT | 40 |
| 6 | AP ERROR | OS REBOOT | 50 |
| ⋮ | ⋮ | ⋮ | ⋮ |
| n | | | |

FIG. 13

| NUMBER | FAILURE STATE | COUNTERMEASURE COMAMND SELECTION INFORMATION |
|---|---|---|
| 1 | AP ERROR | MEMORY REMAINING AMOUNT |
| 2 | AP ERROR | CPU LOAD |
| 3 | OUTSIDE CPU LOAD RANGE | CPU LOAD |
| ⋮ | ⋮ | ⋮ |

| NUMBER | CONDITIONAL EXPRESSION | COUNTERMEASURE COMMAND | PRIORITY |
|---|---|---|---|
| 1 | MEMORY REMAINING AMOUNT < 20 | AP REBOOT | 80 |
| 2 | MEMORY REMAINING AMOUNT < 20 | OS REBOOT | 50 |
| 3 | CPU LOAD > 80 | OS REBOOT | 70 |
| 4 | CPU LOAD > 80 | ADDITION OF MACHINE | 40 |
| 5 | AP ERROR | AP REBOOT | 40 |
| 6 | AP ERROR | OS REBOOT | 50 |
| 7 | OUTSIDE CPU LAOD RANGE | AP REBOOT | 50 |
| ⋮ | ⋮ | ⋮ | ⋮ |
| n | | | |

603

FAILURE RECOVERY APPARATUS, FAILURE RECOVERY METHOD, MANAGER, AND PROGRAM

BACKGROUND OF THE INVENTION

The present invention relates to an apparatus for recovering the trouble of an information processor that provides information communications services such as WEB services or task services. Particularly, the present invention relates to a failure recovery apparatus having a failure-resistant function that detects a failure state and executes a countermeasure command.

The information communications services, such as information services or sales of commodities, through communications networks have rapidly increased their applications because the promotion of business efficiency or attentive user service can be provided with less restriction of time or distance. The increasing application range leads to a significant impact when the computer providing those services fails. For that reason, there is a large concern about the failure-resistant property of the system.

A first conventional art regarding a failure recovery apparatus is disclosed in the patent document 1 (Japanese Patent Publication No. Hei 7-54474). In the first conventional art, at least one failure countermeasure rule, in which a priority is attached to each type of failure, is stored in a rule storage. When a failure occurs in an objective device, a countermeasure command corresponding to the type of the generated failure, in a failure countermeasure rule, is taken out of the rule storage. Until the failure is recovered, countermeasure commands in the failure countermeasure rules having a high priority are executed sequentially, repeatedly, and automatically.

A second conventional art similar to the first conventional art is disclosed in the patent document 2 (Japanese Patent Laid-open Publication No. Hei 8-221295). However, in the second conventional art, a suitable countermeasure method is exhibited to an administrator through the interface screen and the administrator manually performs an actual countermeasure. Moreover, in the second conventional art, the manual work is performed with the administrator's judgement and a countermeasure linked for recovery can be added as a countermeasure effective to the type of a current failure to a rule storage.

The failure recovery apparatus according to the first conventional art works effectively to failures described in the failure countermeasure rules but is totally ineffective to other failures. As seen in the second conventional art, a typical approach to solving such a problem is that a countermeasure for recovery is added as a countermeasure effective to a current failure to a rule storage, with an administrator's judgement, to expand the failure countermeasure rule. However, such an approach requires an administrator having enough knowledge and experiences and imposes an administrator's effort. Moreover, it is difficult to obtain the countermeasure commands effective to all types of failure in advance through experiment because of factors such as time and cost. Particularly, because the type of failure becomes enormous if failures of constituent elements of a low versatility, such as application programs designed respectively, are included, it is difficult to obtain the effective countermeasure commands in advance.

SUMMARY OF THE INVENTION

An object of the present invention is to provide a failure recovery apparatus that has a rule storage for storing countermeasure commands for recovery every failure, whereby even when a failure other than failures described in a failure countermeasure rule occurs, the failure recovery can be tried.

Another object of the present invention is to provide a failure recovery apparatus that automatically creates a new rule when a failure is removed on trial and stores it to a rule storage, whereby the failure can be quickly removed when a similar failure occurs subsequently.

In an aspect of the present invention, a first failure recovery apparatus comprises a rule storage for storing a failure countermeasure rule which describes a failure type and a countermeasure command corresponding to the failure type; and a failure knowledge storage for storing failure knowledge information, which describes a failure type and countermeasure command selection information; wherein when a failure occurring in a service executor matches a failure described in the failure countermeasure rule in the rule storage, a countermeasure command in a matched failure countermeasure rule is read out of the rule storage and is executed on the service executor; wherein when there is not a match, it is decided whether or not a failure occurring in the service executor matches a failure described in failure knowledge information in the failure knowledge storage; wherein when there is a match, a countermeasure command is selected form the rule storage based on countermeasure command selection information corresponding to the matched failure knowledge information and is executed on the service executor.

In the present invention, the second failure recovery apparatus further comprises means for creating a failure countermeasure rule and adding said failure countermeasure rule into the rule storage, the failure countermeasure rule describing a failure type described in the failure knowledge information and a countermeasure command selected from the rule storage based on the countermeasure command selection information; wherein when a failure of the same type occurs again, the failure is dealt with according to the failure countermeasure rule stored in the rule storage.

In another aspect of the present invention, a third failure recovery apparatus comprises a rule storage for storing a failure countermeasure rule containing a conditional expression for decision of a failure type and a countermeasure command; a failure knowledge storage for storing failure knowledge information containing a failure state and countermeasure command selection information; a running status detector for detecting a running state of a service executor; a failure decider for retrieving failure knowledge information from the failure knowledge storage, the failure knowledge information containing a failure state matching a running state detected by the running status detector; a countermeasure retriever for retrieving, from the rule storage, a failure countermeasure rule containing a conditional expression matching a running state detected by the running status detector and outputting a countermeasure command in a failure countermeasure rule obtained through retrieval when the retrieval is successful or selectively outputting a countermeasure command from the failure countermeasure rule in the rule storage based on a countermeasure command selection information in the failure knowledge information when there is failure knowledge information retrieved by the failure decider in failure of the retrieval; and a command executor for receiving a countermeasure command from the countermeasure retriever and executing the countermeasure command on the service executor.

In the fourth failure recovery apparatus of the present invention, countermeasure command selection information in the failure knowledge information contains a parameter related to a failure state in the failure knowledge information of parameters appearing in a conditional expression in a failure countermeasure rule stored in the rule storage; and the countermeasure retriever selects a countermeasure command in a failure countermeasure rule, in which a conditional expression contains a parameter described in countermeasure command selection information.

In the present invention, the fifth failure recovery apparatus further comprises an effect decider for deciding a success or failure of recovery based on the executed countermeasure command and changing said priority information according to the decision result. The rule storage stores priority information on an application order of failure countermeasure rules. The countermeasure retriever sequentially selectively outputs the countermeasure commands based on the priority information until the failure recovers when plural countermeasure commands selected by the countermeasure command selection information exist.

In the sixth failure recovery apparatus of the present invention, the countermeasure retriever creates a failure countermeasure rule and adding the countermeasure rule to the rule storage, the failure countermeasure rule describing a failure state described in the failure knowledge information and a countermeasure command selected from the rule storage based on the countermeasure command selection information. When the same failure state occurs again, the failure is dealt with according to the failure countermeasure rule stored in the rule storage.

The failure recovery apparatus of the present invention further comprises a peculiar status detector for detecting a peculiar state of the service executor based on a history of a running state detected by the running status detector and outputting peculiar state information. The failure decider receives the peculiar state information and creates failure knowledge information, including a failure state and countermeasure command selection information, and stores the failure knowledge information into the failure knowledge storage, the peculiar state including a failure state, the failure state being the peculiar state, the countermeasure command selection information being a parameter related to the peculiar state among parameters contained in a conditional expression in a failure countermeasure rule stored in the rule storage.

The failure recovery apparatus of the present invention further comprises an interactive controller, disposed between the countermeasure retriever and the command executor, for inquiring from a user go or no-go of execution of a countermeasure command selectively output by the countermeasure retriever through a user input/output device, based on countermeasure command selection information of the failure knowledge information.

The failure recovery apparatus of the present invention further comprises an interactive controller for outputting a failure countermeasure rule created by the countermeasure retriever and an effect decision result thereof, to a user input/output device, according to the failure knowledge information, and correcting a failure countermeasure rule stored in the rule storage and failure knowledge information stored in the failure knowledge storage, according to an input from the user input/output device.

The failure recovery apparatus of the present invention further comprises an interactive controller for outputting a failure countermeasure rule to a user input/output device, the failure countermeasure rule including failure knowledge information created by the failure decider according to the peculiar state information and a countermeasure command selected from the rule storage by the countermeasure retriever according to the failure knowledge information, and correcting a failure countermeasure rule stored in the rule storage and failure knowledge information stored in the failure knowledge information according to an input from the user input/output device.

In another aspect of the present invention, a first failure recovery method comprises the steps of using a rule storage for storing a failure countermeasure rule describing a type of failure and a countermeasure command against the type of failure and a failure knowledge storage for storing failure knowledge information describing a type of failure and countermeasure command selection information; when a failure occurring in a service executor matches a failure described in a failure countermeasure rule stored in the rule storage, reading a countermeasure command corresponding to a matched failure countermeasure rule from the rule storage and executing the command on the service executor; when there is no match, deciding whether or not a failure occurring in the service executor matches a failure described to the failure knowledge information in the failure knowledge storage; and when there is a match, selecting a countermeasure command from the rule storage based on countermeasure command selection information of the matched failure knowledge information and executing the countermeasure command on the service executor.

In the second failure recovery method of the present invention, the countermeasure retriever creates a failure countermeasure rule, the failure countermeasure rule describing a type of failure described in the failure knowledge information and a countermeasure command selected from the rule storage based on the countermeasure command selection information and adds the countermeasure command rule to the rule storage; whereby when a failure of the same type occurs again, countermeasure is performed according to the failure countermeasure rule stored in the rule storage.

In another aspect of the present invention, a third failure recovery method comprises the steps of a) detecting a running state of a service executor, using a running status detector; b) retrieving failure knowledge information including a failure state matching the detected running state from a failure knowledge storage, which stores failure knowledge information including a failure state and countermeasure command selection information, using a failure decider; c) when said detected running state matches a conditional expression described in any failure countermeasure rule in the rule storage storing failure countermeasure rules including a failure decision conditional expression and a countermeasure command, outputting a countermeasure command of a matched failure countermeasure rule, using the countermeasure retriever, or when there is no match and there is failure knowledge information retrieved in the step (b), outputting a countermeasure command selected from a failure countermeasure rule in the rule storage based on countermeasure command selection information in the failure knowledge information; and d) receiving the output countermeasure command using a command executor and then executing the countermeasure command on the service executor.

In the fourth failure recovery method of the present invention, countermeasure command selection information in the failure knowledge information includes a parameter related to a failure state in the failure knowledge information among parameters appearing in a conditional expression in a failure countermeasure rule stored in the rule storage. A countermeasure command in a failure countermeasure rule including a conditional expression having parameters described in countermeasure command selection information is selected in the step (c).

In the present invention, the fifth failure recovery method further comprises the step e) of deciding a success or failure of recovery by the executed countermeasure command, using an effect decider, and changing the priority information according to the decision result. The rule storage stores priority information on an application order of failure countermeasures rules. The countermeasures commands outputs sequentially and selectively based on the priority information until recovery of the failure when plural countermeasure commands selectable with the countermeasure command selection information exists in the step (c).

In the present invention, the sixth failure recovery method further comprises the step of f) creating a failure countermeasure rule using the countermeasure retriever, the failure countermeasure rule describing a failure status described in the failure knowledge information and a countermeasure command selected from the rule storage based on the countermeasure command selection information; and adding the failure countermeasure rule to the rule storage. When the same failure state occurs again, the failure is dealt with according to the failure countermeasure rule stored in the rule storage.

In the present invention, the seventh failure recovery method further comprises the steps of g) detecting a peculiar state of the service executor based on a history of the detected running state, by means of a peculiar status detector, and then outputting peculiar state information; and h) receiving the peculiar state information using the failure decider and creating failure knowledge information, the failure knowledge information including a failure state being the peculiar state and countermeasure command selection information being a parameter related to the peculiar state among parameters appearing in a conditional expression in a failure countermeasure rule stored in the rule storage, and then storing said failure knowledge information into the failure knowledge storage.

In the present invention, the eighth failure recovery method further comprises the step of inquiring, of a user through a user input/output device, whether or not an interactive controller disposed between the countermeasure retriever and the command executor can execute a countermeasure command selectively output by means of the countermeasure retriever based on countermeasure command selection information in the failure knowledge information.

In the present invention, the ninth failure recovery method comprises the steps of, by means of an interactive controller, outputting a failure countermeasure rule created by the countermeasure retriever according to the failure knowledge information and the effect decision result to a user input/output device, using an interactive controller; and correcting a failure countermeasure rule stored in the rule storage and failure knowledge information stored in the failure knowledge storage, according to an input from the user input/output device.

In the present invention, the tenth failure recovery method further comprises the steps of, by means of an interactive controller, outputting a failure countermeasure rule to a user input/output device, the failure countermeasure rule including failure knowledge information created by the failure decider based the peculiar state information and a countermeasure command selected from the rule storage by the countermeasure retriever based on the failure knowledge information; and correcting a failure countermeasure rule stored in the rule storage and failure knowledge information stored in the failure knowledge storage, according to an input from the user input/output device.

In another aspect of the present invention, a first manager comprises a rule storage for storing a failure countermeasure rule, which includes a conditional expression for failure decision and a countermeasure command; a failure knowledge storage for storing failure knowledge information, which includes a failure state and countermeasure command selection information; a running status detector for detecting a running state of a service executor; a failure decider for retrieving failure knowledge information from the failure knowledge storage, the failure knowledge information including a failure state matching a running state detected by the running status detector; a countermeasure retriever for retrieving a failure countermeasure rule including a conditional expression matching a running state detected by the running status detector, from the rule storage, and outputting, when the retrieval is successful, a countermeasure command in a failure countermeasure rule obtained through retrieval, or selectively outputting, when the retrieval is not successful, a countermeasure command from a failure countermeasure rule in the rule storage based on countermeasure command selection information in the failure knowledge information, provided that there is failure knowledge information retrieved by the failure decider; and a command executor for receiving a countermeasure command from the countermeasure retriever and executing the countermeasure command on the service executor.

In the second manager according to the present invention, countermeasure command selection information in the failure knowledge information includes a parameter related to a failure state in the failure knowledge information among parameters appearing in a conditional expression in a failure countermeasure rule stored in the rule storage. The countermeasure retriever selects a countermeasure command in a failure countermeasure rule including a parameter described in countermeasure command selection information in a conditional expression.

In the present invention, the third manager further comprises an effect decider for deciding a success or failure of recovery by the executed countermeasure command and changing the priority information according to the decision result. The rule storage stores priority information on an application order of failure countermeasure rules. The countermeasure retriever outputs the countermeasure command selectively and sequentially based on the priority information until the failure recovers when plurality countermeasure commands to be selected with the countermeasure command selection information exist.

In the fourth manager of the present invention, the countermeasure retriever creates a failure countermeasure rule, which describes a failure state described in the failure knowledge information and a countermeasure command selected from the rule storage based on the countermeasure command selection information, and adds the failure countermeasure rule to the rule storage, and deals with the failure according to the failure countermeasure rule stored in the rule storage when the same failure state occurs again.

In the present invention, the fifth manager further comprises a peculiar status detector for detecting a peculiar state of the service executor from a running state history detected by the running status detector and then outputting peculiar state information. The failure decider receives the peculiar state information and creates failure knowledge information, the failure knowledge information including the peculiar state being a failure state and a parameter related to the peculiar state among parameters included in a conditional expression in a failure countermeasure rule stored in the rule storage, being countermeasure command selection information, and stores the failure knowledge information into the failure knowledge storage.

In the present invention, the sixth manager further comprises an interactive controller disposed between the countermeasure retriever and the command executor, for inquiring of a user through a user input/output device the go or no-go of a countermeasure command selectively output from the countermeasure retriever based on countermeasure command selection information in the failure knowledge information.

In the present invention, the seventh manager further comprises an interactive controller for outputting a failure countermeasure rule created by the countermeasure retriever according to the failure knowledge information and the effect decision result thereof to a user input/output device and correcting a failure countermeasure rule stored in the rule storage according to an input from the user input/output device and failure knowledge information stored in the failure knowledge storage.

In the present invention, the eighth manager further comprises an interactive controller for outputting a failure countermeasure rule to a user input/output device, the failure countermeasure rule including failure knowledge information created by the failure decider based on the peculiar state information and a countermeasure command selected from said rule storage by the countermeasure retriever based on the failure knowledge information and correcting a failure countermeasure rule stored in the rule storage and failure knowledge information stored in the failure knowledge storage according to an input from the user input/output device.

In the first to third failure recovery apparatuses and methods and the first manager of the present invention, a failure knowledge storage that stores failure knowledge information is used in addition to the rule storage. When a failure occurring in the service executor does not match a failure described in the failure countermeasure rule in the rule storage, it is decided whether or not the resulted failure matches the failure described in the failure knowledge information in the failure knowledge storage. If there is a match, a countermeasure command is selected from the rule storage based on the countermeasure command selection information of the matched failure knowledge information and then is executed on the service executor. The recovery of the failure can be tried even if a failure other than failures described in the failure countermeasure rule occurs. Therefore, the certain recovery may not be guaranteed but the system availability is increased, compared with the case where a failure other than failures described in the failure countermeasure rule is left.

In the second and sixth failure recovery apparatuses and methods and the fourth manger of the present invention, when the countermeasure command selected based on countermeasure command selection information in failure knowledge information is effective to a failure other than failures described in a failure countermeasure rule, a failure countermeasure rule is automatically added. Thus, the same type of failure, reoccurred later, can be dealt with a failure countermeasure rule stored in the rule storage. As a result, the same type of failure can be quickly recovered. This allows the burden of a manager in rule creation to be alleviated largely and an error in countermeasure to be prevented.

In the fourth failure recovery apparatus and method and the second manager of the present invention, the countermeasure command selection information in failure knowledge information includes a parameter relating to a failure state in the failure knowledge information among parameters appearing in the conditional expression in a failure countermeasure rule stored in a rule storage. A countermeasure command in the failure countermeasure rule, in which the conditional expression has parameters described in the countermeasure command selection information, is selected. For that reason, the probability of recovery is increased, compared with the case where the countermeasure command is selected randomly, so that the availability of the system increases by the increment of the probability.

In the fifth failure recovery apparatus and method and the third manager of the present invention, when plural countermeasure commands selected with the countermeasure command selection information exist, the countermeasure commands are sequentially selected on trial based on the priority information on application order of failure countermeasure rules until a failure is recovered. Thus, the possibility of recovery can be more improved. Moreover, because the success or failure of recovery by the executed countermeasure command is decided and the priority information is changed according to the decision result. For that reason, the priority control can be performed according to the effects on the failure described in the failure knowledge information and the failure described in the failure countermeasure rule. The application order of failure countermeasure rules can be learnt according to actual characteristics of the service executor, including a failure described in the failure knowledge information.

In the seventh failure recovery apparatus and method and the fifth manager of the present invention, every time a new peculiar state of the service executor is detected, failure knowledge information, being countermeasure command selection information, is created and is added to a failure knowledge storage. The failure knowledge information is formed of a failure state being the peculiar state, and a parameter relating to the peculiar state among parameters included in the conditional expression in the failure countermeasure rule stored in the rule storage. For that reason, the type of failure, which can be dealt with, except failures described in the failure countermeasure rule, can be increased automatically. This allows the availability of the system to be more increased and the burden of the administrator adding the failure knowledge information to be alleviated.

In the eighth failure recovery apparatus and method and the sixth manager of the present invention, the interactive controller outputs, to the command executor, a countermeasure command approved in execution through interaction with a user, among countermeasure commands output from the countermeasure retriever. For that reason, if the countermeasure command selected based on the countermeasure command selection information in the failure knowledge information is insufficient, the user can cease the execution. Thus, the problem occurring when an insufficient countermeasure command is executed can be prevented in the bud.

In ninth failure recovery apparatus and method and the seventh manager of the present invention, a new failure countermeasure rule created by the countermeasure retriever according to the failure knowledge information and the effect decision result are exhibited to the user via the interactive controller. The user can correct the failure knowledge information and the failure countermeasure rule through the interactive operation. Thus, the apparatus can add automatically a failure countermeasure rule. The user can grasp and correct, if necessary, the status of execution. Moreover, the user can obtain and verify the know-how necessary for management through the behavior of the system.

In the tenth failure recovery apparatus and method and the eighth manager of the present invention, a failure countermeasure rule, including new failure knowledge information created by the failure decider according to peculiar state information and a countermeasure command selected from the rule storage based on the failure knowledge information, is exhibited to the user via the interactive controller. Thus, the user can grasp and correct, if necessary, the peculiar state automatically detected by the apparatus from the service executor and the status of the failure countermeasure according to the peculiar state. Moreover, the user can obtain and verify the know-how necessary for the management through the behavior of the system.

BRIEF DESCRIPTION OF THE DRAWINGS

This and other objects, features and advantages of the present invention will become more apparent upon a reading of the following detailed description and drawings, in which:

FIG. 1 is a block diagram schematically illustrating a failure recovery apparatus based on the premise of the present invention;

FIG. 2 is a diagram illustrating a failure countermeasure rule to be stored in a rule storage;

FIG. 9 is a diagram illustrating a change of a failure countermeasure rule according to the second embodiment of the present invention;

FIG. 10 is a schematic diagram illustrating another change of a failure countermeasure rule according to the second embodiment of the present invention;

FIG. 13 is a diagram illustrating a change of failure knowledge information according to the third embodiment of the present invention;

FIG. 14 is a diagram illustrating another change of failure knowledge information according to the third embodiment of the present invention;

DESCRIPTION OF THE EMBODIMENTS

Figure 3:
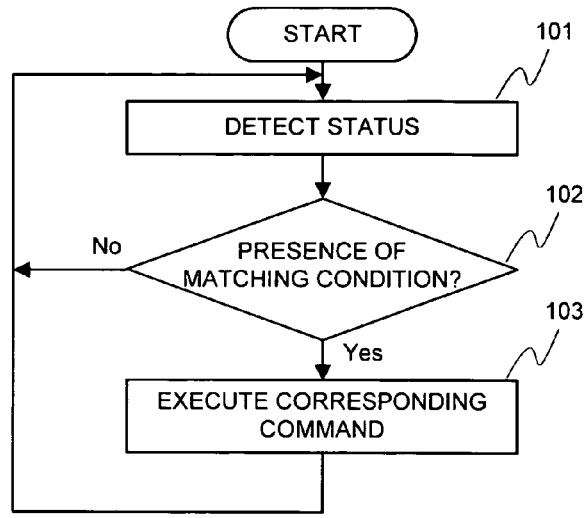
FIG. 3 is a flowchart showing an operation of a failure recovery apparatus based on the premise of the present invention.

Before an explanation of embodiment of the present invention, a failure recovery apparatus, being a premise of the present invention, will be explained below by referring to FIGS. 1, 2 and 3.

Referring to FIG. 1, a failure recovery apparatus of the present invention consists of a running status detector 1 and a command executor 4, each which is connected to a service executor 11, a rule storage 2, and a countermeasure retriever connected to them.

The service executor 11 is, for example, an information processor that provides information communications services such as WEB services or business services.

The rule storage 2 is a storage that stores failure countermeasure rules. FIG. 2 illustrates a failure countermeasure rule group 600. Each failure countermeasure rule includes a conditional expression for deciding a failure, a countermeasure command for the failure, and a priority of the rule. The conditional expression is information specifying the running state of the service executor 11 considered as an occurrence of a failure or as an occurrence of a sign of the failure and defines as a parameter a memory remaining amount or a CPU load. The countermeasure command is used to recover and avoid failure when the conditional expression is satisfied. The priority shows the order in which failure countermeasure rules are applied. The larger the numeral value is the higher the priority is. In the failure countermeasure rules numbered by, for example, 1 and 2, shown in FIG. 2, the memory remaining amount of less than 20 in the service executor 11 represents a failure state. An application program (AP) reboot command acting as a countermeasure command to be executed in the failure state is defined so as to have a priority of 80. An operation system (OS) reboot command acting as a countermeasure command to be executed in the failure state is defined so as to have a priority of 50. Similarly, in the failure countermeasure rules numbered by 3 and 4, the CPU load more than 80 is defined as failure. OS reboot acting as a countermeasure command to be executed in the failure state is defined so as to have a priority of 70. Addition of machine acting as a countermeasure command to be executed in the failure state is defined so as to have a priority of 40. Referring to FIG. 2, all the conditional expressions, each showing a type of failure, have a mathematical formula having numerical values. However, the numerical formula should not be limited only to the examples.

The running status detector 1 captures a running state of the service executor 11 and then outputs it to the countermeasure retriever 3. As captured running states are listed various statuses such as boot/stop status of the service executor 11, boot/stop status of an application program, error status of an application program, CPU status, or memory status. Arbitrary methods can be used as the method of capturing the running state of the service executor 11. For example, in one method, a SNMP (Simple Network Management Protocol) agent is stationed in the service executor 11 to periodically transmit a SNMP request to the SNMP agent, thus capturing the running state. In another method, a SNMP trap event is set to the service executor 11 to receive the running state when the SNMP trap event occurs.

The countermeasure retriever 3 retrieves from the rule storage 2 a failure countermeasure rule including a conditional expression matching the running state detected by the running status detector 1 and then outputs a countermeasure command in the failure countermeasure rule to the command executor 4. If plural failure countermeasure rules matching the conditional expression exist, countermeasure commands are selectively output sequentially from one having a higher priority of failure countermeasure rules.

The command executor 4 receives a countermeasure command from the countermeasure retriever 3 and then executes it on the service executor 11.

FIG. 3 is a flowchart showing the operation of the failure recovery apparatus of FIG. 1. The running status detector 1 detects the running state of the service executor 11 (step 101 in FIG. 3). The countermeasure retriever 3 receives a current running state from the running status detector 1 and then retrieves whether or not the current running state matches a conditional expression in a failure countermeasure rule stored in the rule storage 2 (step 102). When there is not any failure countermeasure rule having a matched conditional expression, it is decided that there is no failure so that the flow goes back to the step 101.

When there is a failure countermeasure rule having a matched conditional expression, the countermeasure retriever 3 recognizes an occurrence of failure and sends the corresponding countermeasure command to the command executor 4, thus executing it on the service executor 11 (step 103). For example, when a detected running state indicates "a memory remaining amount of less than 20", it matches the conditional expressions numbered by 1 and 2 in FIG. 2, so that countermeasure commands, AP reboot and OS reboot, are selected as candidates. However, because AP reboot has a higher priority, "AP reboot" is selected as a countermeasure command and is output to the command executor 4. The command executor 4 receives the countermeasure command and indicates the service executor 11 to execute it. Thus, an application in the service execution environment is rebooted. Thereafter, in the step 101, the running status detector 1 detects the running state after the execution of the countermeasure command. If the memory remaining amount less than 20 is kept (step 102), OS reboot is executed as the next countermeasure command (step 103). When the memory remaining amount is more than 20, there is no matched failure state, so that a countermeasure of the failure is completed.

As described above, because the failure recovery apparatus shown in FIG. 1 automatically executes a countermeasure command under predetermined conditions, the failure described in a failure countermeasure rule of the service executor 11 can be automatically recovered and avoided. However, the failure recovery apparatus cannot deal with the failure not described in the failure countermeasure rule.

Next, an embodiment of the present invention will be described in detail by referring to the attached drawings First Embodiment First, a first embodiment according to the present invention will be explained by referring to FIGS. 4, 5 and 6.

Figure 4:
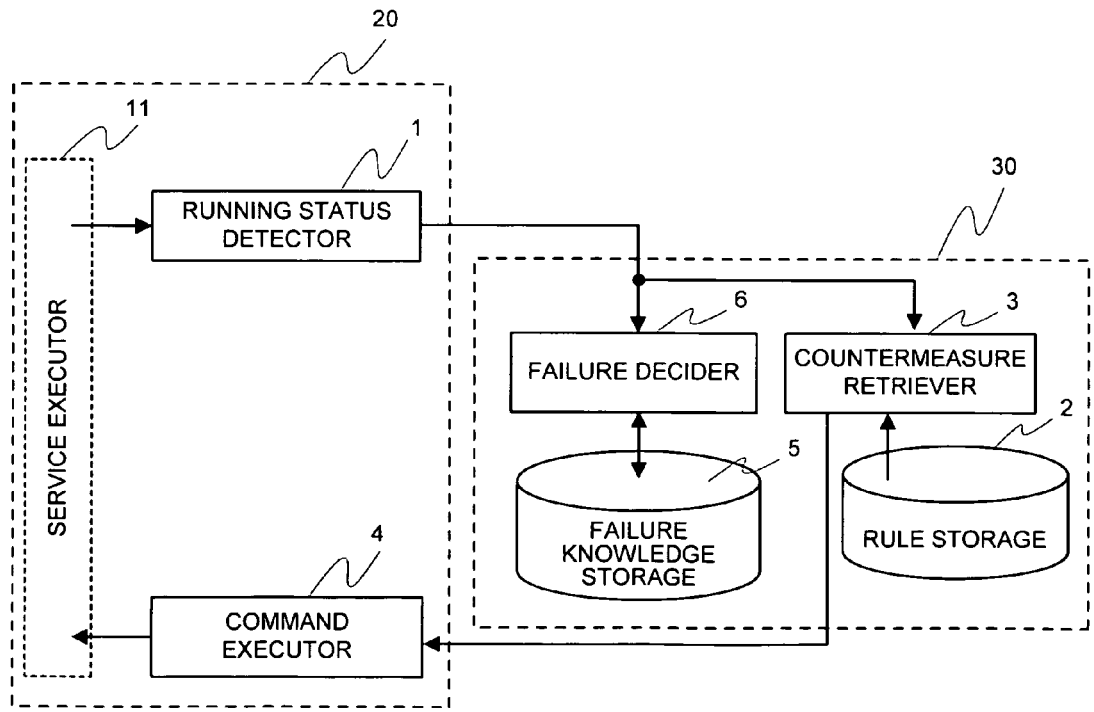
FIG. 4 is a block diagram showing a configurational example according to a first embodiment of the present invention.

Referring to FIG. 4, the failure recovery apparatus of the present invention consists of an agent 20 and a manager 30. The agent 20 includes a running status detector 1 and a command executor 4, which are on the side of the service executor 11. The manager 30 includes a rule storage 2, a countermeasure retriever 3, a failure knowledge storage 5, and a failure decider 6. In FIG. 4, one agent 20 is connected to the manager 30 through a network (not shown). However, plural agents 20 may be connected to the manager 30.

Referring to FIG. 4, the service executor 11, the running status detector 1 and the command executor 4, in the agent 20, are identical to corresponding ones in the failure recovery apparatus being a premise of the present invention shown in FIG. 1. The rule storage 20 in the manager 30 is identical to those in the failure recovery apparatus being a premise of the present invention shown in FIG. 1. In the manager 30, the failure knowledge storage 5, the failure decider 6, and the countermeasure retriever 3 have the following functions, respectively.

The failure knowledge storage 5 stores failure knowledge information describing a failure state representing a type of failure and selection information for selecting a countermeasure command stored in the rule storage 2. A failure countermeasure rule in the rule storage 2 is associated with a countermeasure command, verified as being effective to some extent to a failure. On the other hand, the failure knowledge information stored in the failure knowledge storage 5 is associated with the countermeasure command, to which the administrator considers that effectiveness is vague to a failure except failures described in a failure countermeasure rule but there is a value of trial execution. This idea may be somewhat far-fetched. However, the countermeasure command to be finally executed is consistently a countermeasure command in a verified failure countermeasure rule stored in the rule storage 2. It was ascertained that the countermeasure command has no problem in execution. For that reason, there is no risk of providing a fatal failure to the service executor 11.

Figures 5, 6:
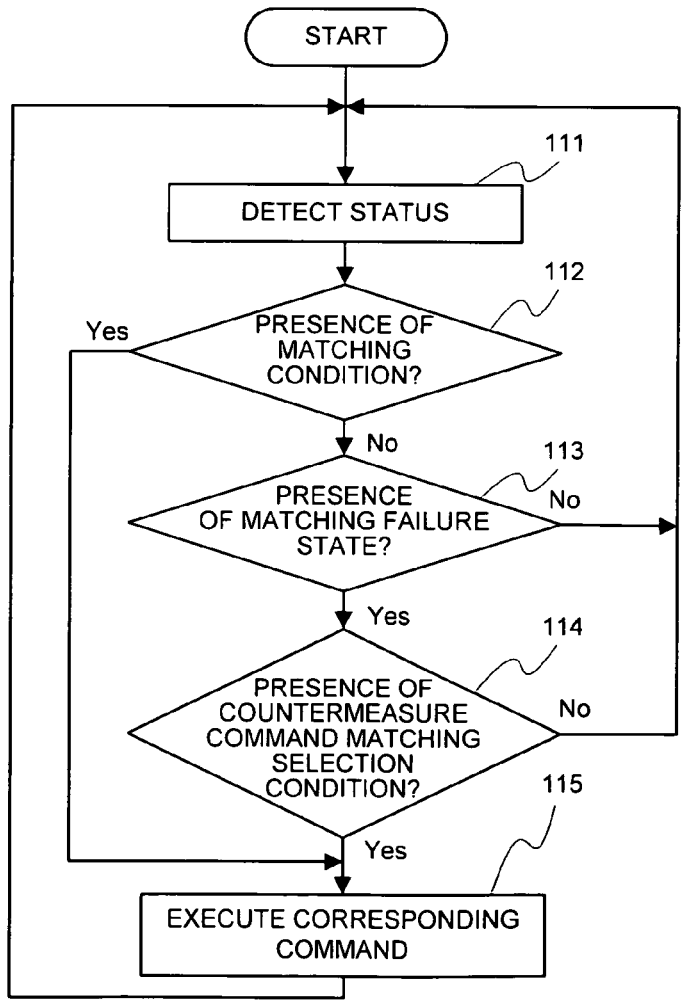
FIG. 5 is a diagram illustrating failure knowledge information according to the first embodiment of the present invention.
FIG. 6 is a flowchart showing the operation of the first embodiment of the present invention.

FIG. 5 shows an example of the failure knowledge information 501 stored in the failure knowledge storage 5. In the failure knowledge information of the number 1, "AP error" is defined to the failure state showing the type of failure. The parameter of "memory remaining amount" is defined to the countermeasure command selection information. The failure knowledge information of the number 1 means that when an AP error occurrence error generates, a countermeasure command in a failure countermeasure rule having a conditional expression related to a parameter, or a memory remaining amount, is selected. Therefore, when the content of the rule storage 2 is one shown in FIG. 2, AP reboot and OP reboot corresponding to "memory remaining amount <20" are selected as countermeasure commands. Similarly, the failure knowledge information of the number 2 means that when an AP error occurrence error generates, a countermeasure command in a failure countermeasure rule having a conditional expression related to a parameter, or a CPU load, is selected. Therefore, when the content of the rule storage 2 is one shown in FIG. 2, OS reboot and addition of machine, corresponding "CPU load >80", are selected as countermeasure commands.

In the failure knowledge information shown in FIG. 5, a running state related to a failure state is defined as countermeasure command selection information. That is, because it is supposed that a failure error, or, AP error, is related to the memory remaining amount or the load of a CPU, parameters, or "memory remaining amount" and "CPU load", are defined as countermeasure command selection information. When a running state related to a failure state is set as countermeasure command selection information, the parameter is selected from among parameters appearing in the conditional expression of a failure countermeasure rule in the rule storage 2. In addition to the setting of a running state related to a failure state to the countermeasure command selection information, the number of a failure countermeasure rule stored in the rule storage 2 can be set to the countermeasure command selection information. In an extreme case, "ANY" representing the selection of all countermeasure commands may be set.

The failure decider 6 retrieves failure knowledge information including a failure state matching the running state of the service executor 11 detected by the running status detector 1 from the failure knowledge storage 5.

The countermeasure retriever 3 has the same function as that of the equivalent in the failure recovery apparatus being a premise of the present invention shown in FIG. 1. That is, the countermeasure retriever 3 retrieves, from the rule storage 2, a failure countermeasure rule including a conditional expression matching a running state of the service executor 11 detected by the running status detector 1, captures a countermeasure command in the failure countermeasure rule, and outputs it to the command executor 4. Moreover, the countermeasure retriever 3 captures a countermeasure command from the rule storage 2 based on the countermeasure command selection information in the failure knowledge information retrieved by the failure decider 6 and then outputs it to the command executor 4.

FIG. 6 is a flowchart showing an operation of the failure recovery apparatus according to the present embodiment. The operation of the embodiment will be explained below in the case where an initial state corresponds to the failure countermeasure rule shown in FIG. 2 and the failure knowledge information shown in FIG. 5.

The running status detector 1 detects the running state of the service executor 11 (step 111 in FIG. 6). The countermeasure retriever 3 refers to the rule storage 2 and decides whether or not a failure countermeasure rule having a conditional expression matching a current running state exists (step 112). If yes, the running status detector 1 captures a countermeasure command from an existing failure countermeasure rule, outputs it to the command executor 4, in a manner similar to that of the failure recovery apparatus being a premise of the present invention shown in FIG. 1. Thus, the countermeasure command is executed on the service executor 11 (step 115).

On the other hand, in the failure recovery apparatus being a premise of the present invention shown in FIG. 1, the case where a failure countermeasure rule having a conditional expression matching a current running state does not exist is handled as no occurrence of failure. However, in the present embodiment, the following process is carried out.

The failure decider 6 refers to the failure knowledge storage 5 and decides whether or not there is failure knowledge information having a failure state matching a running state detected by the service executor 11 (step 113). When there is no failure knowledge information having a failure state matching a current running state, the failure decider 6 recognizes it as no occurrence of failure. Thus, the flow goes back to the step S111. However, when the failure knowledge information exists, the failure decider 6 outputs the countermeasure command selection information in the failure knowledge information to the countermeasure retriever 3. The countermeasure retriever 3 refers to the rule storage 2 and decides whether or not a countermeasure command to be selected is in the rule storage 2 based on the countermeasure command selection information (step 114). If no countermeasure command exists, the flow goes back to the step S111. If the countermeasure command selected based on the countermeasure command selection information exists, it is output to the command executor 4 and is executed in the service executor 11 (step 115).

For example, it is assumed that the running status detector 1 detects the system state of the service executor 11, that is, an event representing "AP error". Because the failure countermeasure rule having a conditional expression matching the event does not exists in the rule storage 2, the failure recovery apparatus being a premise in FIG. 1 recognizes no occurrence of failure and implements nothing. However, in the present embodiment, the following operations are performed.

First, the failure decider 6 retrieves failure knowledge information (No. 1 and No. 2) having "AP error" matching a current state, "AP error", of the service executor 11 from the failure knowledge storage 5. Next, the countermeasure retriever 3 derives "memory remaining amount" and "CPU load" as countermeasure command selection information from the retrieved failure knowledge information and retrieves a failure countermeasure rule having a conditional expression related to those countermeasure command selection information from the rule storage 2 in FIG. 2. Referring to FIG. 2, the failure countermeasure rules of the numbers 1 to 4 are applied. Hence, the countermeasure command is executed on the service executor 11 until the failure state, "AP error", is eliminated sequentially from the countermeasure command, "AP reboot", in the failure countermeasure rule of the number 1 having the highest priority.

According to the present embodiment described above, when a failure except failures described in a failure countermeasure rule occurs in the service executor 11, a countermeasure command is selected from the rule storage 2 based on the countermeasure command selection information in failure knowledge information having a failure state matching the failure. Then, the selected countermeasure command is executed on trial in the service executor 11. Compared with the failure recovery apparatus in FIG. 1, which is totally ineffective when a failure except failures described in a failure countermeasure rule occurs, the present failure recovery apparatus can improve the failure recovery rate and the system availability.

By omitting the failure knowledge storage 5 and the failure decider 6 but adding the rule storage 2 which stores a failure countermeasure rule having "occurrence of AP error" in the conditional expression and "AP reboot" in the countermeasure command, the failure recovery apparatus operates in a manner similar to that of the present embodiment. Let us now assume that the uncertain failure countermeasure rule is added to the rule storage 2 before the effectiveness of the countermeasure command, "AP reboot", to a failure such as "occurrence of AP error" is not verified. This means that a verified effective failure countermeasure rule and an uncertain failure countermeasure rule in an unverified state are mixedly stored together in the rule storage 2. In such a case, a problem arises in the rule management. That is, the retrieval time of a complete effective failure countermeasure rule is deteriorated. Moreover, if a mark is not attached to the rule, it is not possible to identify verified and effective failure countermeasure rules.

The running state and the countermeasure command should not be limited only to the operations and the countermeasure commands exemplified in the present embodiment. The running states detectable and countermeasure commands executable by the service executor 11 according to the configuration of the present invention can provide the same effect. In the explanation, the present embodiment uses a failure countermeasure rule having priority information. However, the present invention should not be limited to only the embodiment. If the description format and content of a failure countermeasure rule or failure knowledge information can define the relevance of a failure countermeasure rule corresponding to a running state regarded as failure, the same effect can be obtained.

Second Embodiment

Next a second embodiment of the present invention will be explained be referring to FIGS. 7 to 10.

Figure 7:
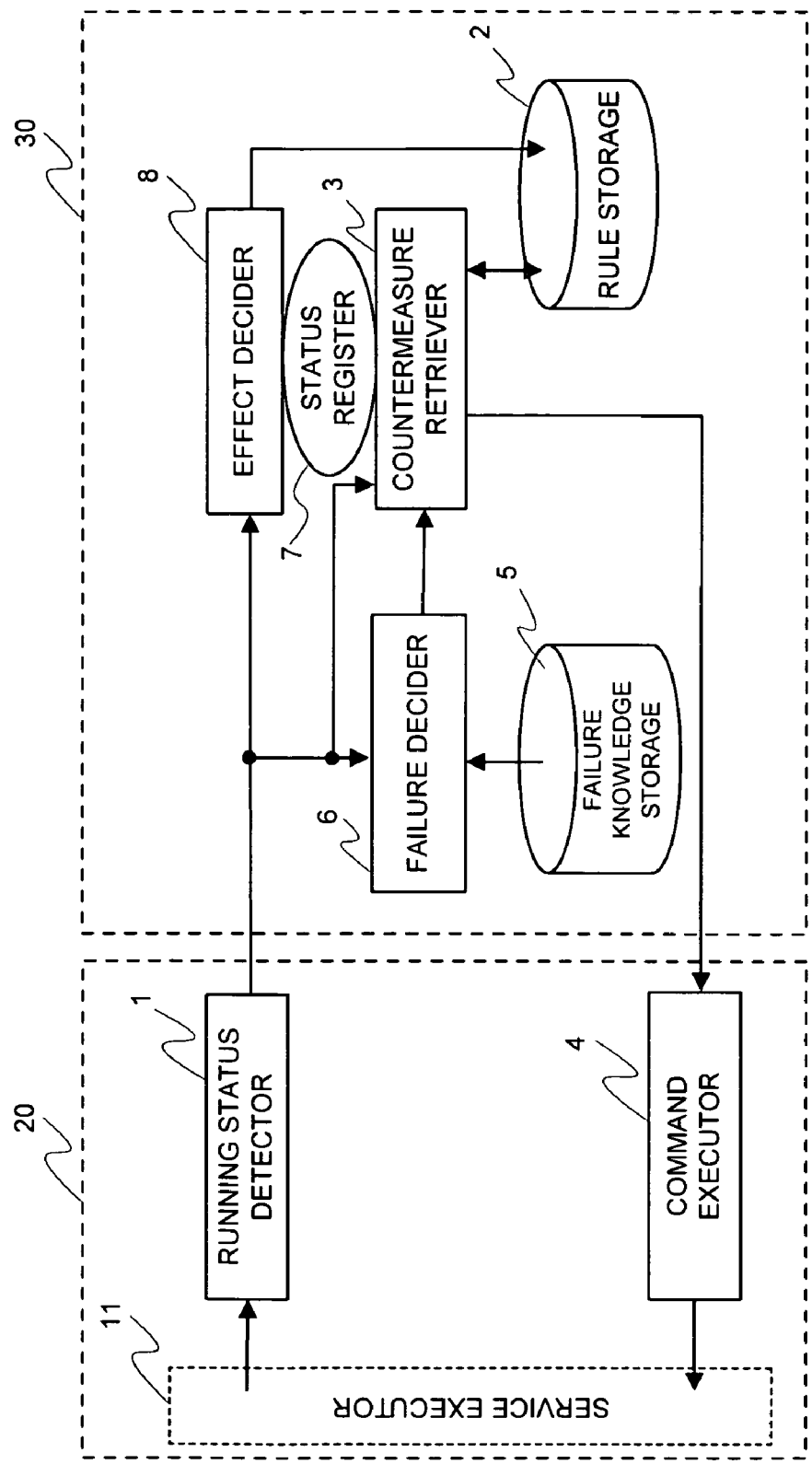
FIG. 7 is a block diagram showing a configurational example according to a second embodiment of the present invention.

In the second embodiment of the present invention shown in FIG. 7, a failure recovery apparatus consists of an agent 20 and a manager 30. The agent 20 includes a running status detector 1 and a command executor 4, each which is disposed on the side of the service executor 11. The manager 30 includes a rule storage 2, a countermeasure retriever 3, a failure knowledge storage 5, a failure decider 6, a status register 7, and a effect decider 8. Referring to FIG. 7, one agent 20 is connected to the manager 30. However, plural agents 20 may be connected.

Referring to FIG. 7, the service executor 11, the running status detector 1 and the command executor 4, in the agent 20, are identical to those in the failure recovery apparatus according to the first embodiment of the present invention shown in FIG. 4. The rule storage 2, the failure knowledge storage 5, and the failure decider 6, in the manager 30, are identical to those in the failure recovery apparatus according to the first embodiment of the present invention shown in FIG. 4. The status register 7, the effect decider 8 and the countermeasure retriever 3, in the manager 30, will be explained below respectively.

The countermeasure retriever 3 has the same function as that in the failure recovery apparatus in the first embodiment in FIG. 4. The countermeasure retriever 3 also has the function of outputting information on a change of running state, which is expected after execution of a countermeasure command, to the status register 7. The change information is derived from the conditional expression in a failure countermeasure rule including the countermeasure command. For example, in the conditional expression, "memory remaining amount <20" is set to "memory remaining amount >20". In the conditional expression, "with AP error", is set to "without AP error". When outputting a countermeasure command selected form the rule storage 2 based on the countermeasure command selection information in the failure knowledge information to the command executor 4, the countermeasure retriever 3 creates a new failure countermeasure rule based on the countermeasure command and based on the failure state in the failure knowledge information and then stores it into the rule storage 2.

The status register 7 stores information output from the countermeasure retriever 3.

The effect decider 8 compares running state change information stored in the status register 7 with the running state of the service executor 11 after execution of a countermeasure command being an output of the running status detector 1 and then decides a success or failure of recovery or avoidance due to the countermeasure command. For example, it is assumed that the status register 7 holds "memory remaining amount >20" as information on a change of a running state expected after execution of a countermeasure command. In such a case, if the running state of the service executor 11 after execution of the countermeasure command is "memory remaining amount >20", it is decided that the recovery or avoidance of the countermeasure command is successful. If the running state of the service executor 11 after execution of the countermeasure command is "memory remaining amount <20", it is decided that the recovery or avoidance of the countermeasure command has failed. The effect decider 8 corrects the priority information of the rule storage 2 according to the decision result.

Figure 8:
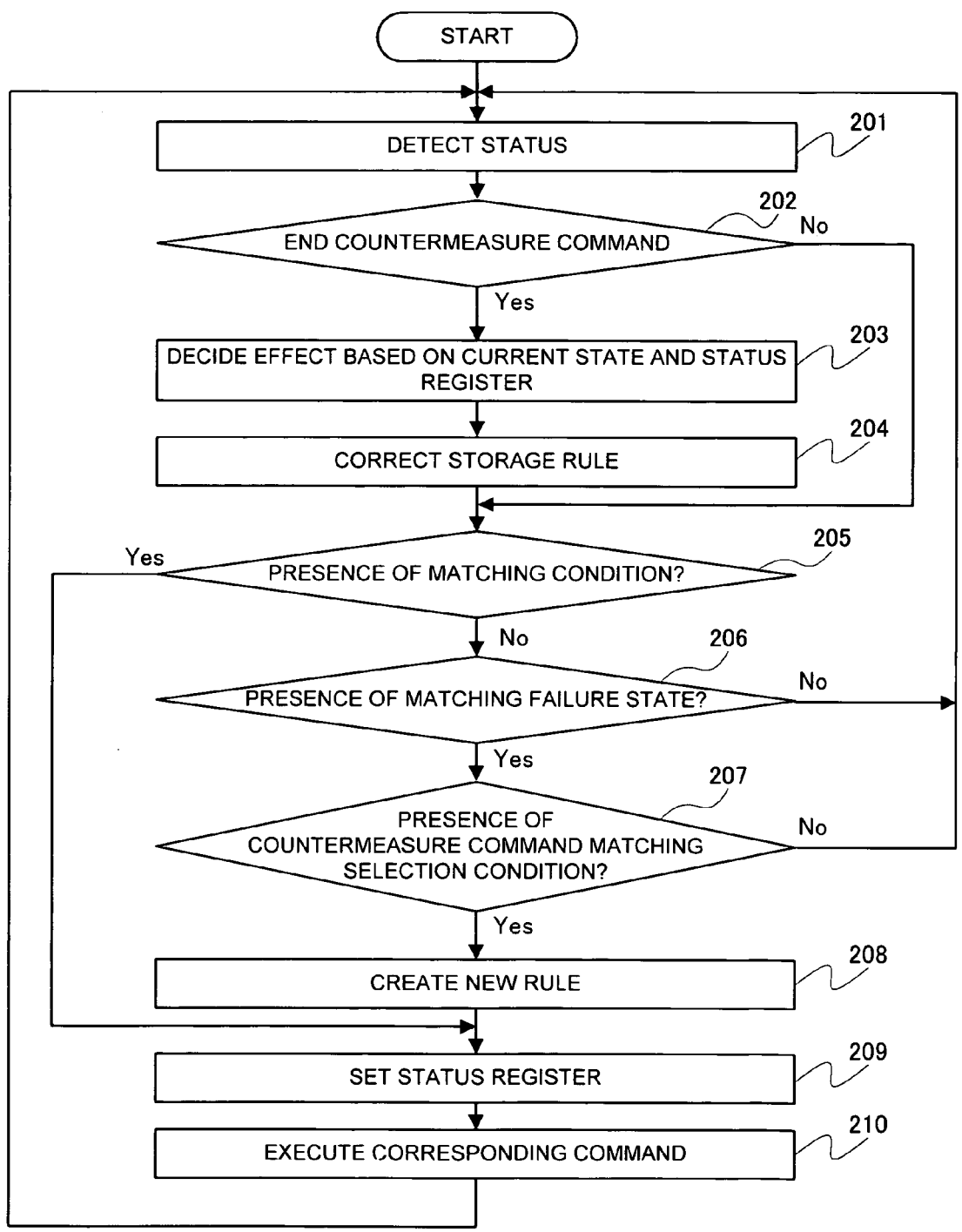
FIG. 8 is a flowchart showing the operation of the second embodiment of the present invention.

FIG. 8 is a flowchart showing the operation of a failure recovery apparatus according to the present embodiment. The operation of the present embodiment will be explained with the example where there are, as an initial state, the failure countermeasure rule in FIG. 2 and the failure knowledge information in FIG. 5.

The running status detector 1 detects the running state of the service executor 11 (step 201 in FIG. 8). Next, the effect decider 8 refers to the status register 7 and decides whether or not the executed countermeasure command exists (step 202). If there no executed countermeasure command, the effect decider 8 performs nothing and the process goes to the step 205. When there is the executed countermeasure command, the effect decider 8 compares the current running state with the content of the status register 7 and decides the effect of the executed countermeasure command (step 203). Thus, the effect decider 8 corrects the priority of the failure countermeasure rule including the executed countermeasure command according to the presence or absence of the effect (step 204).

Next, in the step 205, the countermeasure retriever 3 refers to the rule storage 2 and decides whether or not a failure countermeasure rule having a conditional expression matching a current running state. If yes, the countermeasure retriever 3 captures a countermeasure command from the existing failure countermeasure rule and sets information on a change of a running state expected after execution of the countermeasure command to the status register 7 (step 209). Moreover, the countermeasure retriever 3 outputs the countermeasure command to the command executor 4 and executes it on the service executor 11 (step 210).

In a manner similar to that of the first embodiment, when a failure countermeasure rule having a conditional expression matching a current running state does not exist, the failure decider 6 refers to the failure knowledge storage 5 and then decides whether or not failure knowledge information having a failure state matching a running state detected by the service executor 11 (step 206). When failure knowledge information having a failure state matching a current running state does not exist, the failure decider 6 recognizes the state as no occurrence of failure and the flow goes back to the step 201. In the case of an existence of failure, the countermeasure retriever 3 decides whether or not the rule storage 2 stores a countermeasure command selected with the countermeasure command selection information in the failure knowledge information (step 207). With no existence of the countermeasure command, the flow goes back to the step S201. With an existence of the countermeasure command, the countermeasure retriever 3 creates a new failure countermeasure rule based on the countermeasure command and based on the failure state in the failure knowledge information and then registers it into the rule storage 2 (step 208). The countermeasure retriever 3 also sets information on a change of a running state expected after execution of a selected countermeasure command, to the status register 7, based on the countermeasure command selection information (step 209). Then the countermeasure retriever 3 outputs the countermeasure command to the command executor 4 and executes it on the service executor 11 (step 210).

The failure countermeasure rule registered in the rule storage 2 created in the step 208 decides the effect in the step 203. If no effect is revealed, the priority of the rule is lowered in the step 204. If there is an effect, the priority of the rule is increased.

Next, the operation in the present embodiment where the running state detector 1 detects an event representing "AP error" as the system state of the service executor 11, in a manner similar to that in the first embodiment, will be explained.

When the running status detector 1 detects "AP error" as the running state of the service executor 11 (step 201), the countermeasure retriever 3 refers to the rule storage 2 to decide whether or not a failure countermeasure rule exists having a failure which has a conditional expression matching a current running state (step 205). Since the failure countermeasure rule does not exist, the failure decider 6 refers to the failure knowledge storage 5 and decides whether or not failure knowledge information having a failure state matching a current running state exists (step 206). The failure knowledge storage 5 (shown in FIG. 5) has two sets of failure knowledge information, each having a failure state matching a current running state, "AP error". For that reason, the countermeasure retriever 3 decides whether or not the rule storage 2 has a countermeasure command to be selected with two sets of countermeasure command selection information, "memory remaining amount", and "CPU load" in the failure knowledge information (step 207). In the case of the rule storage 2 (FIG. 2), the countermeasure command, "AP reboot", in the failure countermeasure rule (No. 1) can be selected according to the countermeasure command selection information, "memory remaining amount". The countermeasure command, "OS reboot", in the failure countermeasure rule (No. 2) can be selected according to the countermeasure command selection information, "memory remaining amount". The countermeasure command, "OS reboot", in the failure countermeasure rule (No. 3) can be selected according to the countermeasure command selection information, "CPU load". The countermeasure command, "addition of machine", in the failure countermeasure rule (No. 4) can be selected according to the countermeasure command selection information, "CPU load". Therefore, the countermeasure command "AP reboot" in the failure countermeasure rule (No. 1) having the highest priority is first selected.

The countermeasure retriever 3 creates a new failure countermeasure rule and registers it to the rule storage 2 (step 208). In the new failure countermeasure rule, "AP error" is set in the conditional expression and "AP reboot" is set as a countermeasure command. "AP reboot" represents a selected countermeasure command and "AP error" represents a failure state in failure knowledge information having countermeasure command selection information used to select the countermeasure command. In the rule group 601 shown in FIG. 9, the No. 5 rule represents the new failure countermeasure rule and "50" is set as an initial value of priority. Moreover, the countermeasure retriever 3 outputs the countermeasure command, "AP reboot", and sets the information on a change of a running state expected after execution of the countermeasure command, to the status register 7 (step 209). In this case, it is expected that execution of a countermeasure command causes avoidance of a failure state shown in the conditional expression in the rule, that is, elimination of "AP error". Hence, a countermeasure command, "AP reboot", to be executed and the condition, "without AP error", in the case of a successful countermeasure, are set as running state change information to the status register 7.

Thereafter, the command executor 4 executes the countermeasure command, "AP reboot" (step 210). Then, the flow goes back to the step 201. The running state after execution of the countermeasure command is detected. Next, the effect decider 8 refers to the state register 7 and recognizes the presence of an already executed countermeasure command (step 202), thus comparing a current running state with the condition, "without AP error", of the status register 7 (step 203). If the "AP error" is not detected again, it is decided that the failure has been recovered according to the previous countermeasure command, "AP reboot". The priority of the previously created failure countermeasure rule (No. 5) in FIG. 9 is set to be, for example, 60 (by incrementing by 10) (step 204). Since "AP error" is not detected any more, the countermeasure commands in the remaining failure countermeasure rules (No. 2 to No. 4) are not executed and a new failure countermeasure rule is not created based on the countermeasure command.

In contrast, when "AP error" is detected again regardless of execution of "AP re-execution", it is decided that the previous countermeasure command "AP reboot" has failed so that the priority of the corresponding failure countermeasure rule decreases (step 204). Referring to FIG. 10, the priority of the No. 5 failure countermeasure rule decreases to "40" from the initial value of "50" in FIG. 9. In this case, the countermeasure retriever 3 detects the No. 5 rule in FIG. 10 in the previous step 205 as a failure countermeasure rule having a conditional expression matching a current state, "AP error". However, the method is normally employed which does not select again the same countermeasure command on retrial by storing a countermeasure command in failed in the immediately preceding execution. For that reason, the countermeasure retriever 3 does not select the failure countermeasure rule of No. 5. Alternately, the method may be used which does not select on trial the failure countermeasure rule having a priority having a value less than an initial value of "50". The present embodiment using the latter method will be explained below.

The countermeasure selector 3 decides that there is no failure countermeasure rule having the priority value of more than "50" regarding "AP error" and then seeks for a countermeasure command matching countermeasure command selection information of the failure knowledge information (step 207). Thus, in a manner similar to the previous manner, countermeasure commands are found in the rules of No. 1 to No. 4 in FIG. 10. In this case, when the countermeasure selector 3 selects a countermeasure command, "AP reboot" in the failure countermeasure rule of No. 1 having the highest priority and tries the creation of a new rule using the countermeasure command, the same rule (No. 5) exists already. Thus, when a priority of less than the initial value is detected, the creation of the rule is failed. Hence, the countermeasure command, "OS reboot", in the failure countermeasure rule of No. 3 having the next highest priority is selected. Thus, the new rule using the countermeasure command is created and then stored into the rule storage 2. The failure countermeasure rule of No. 6 in FIG. 10 is a new failure countermeasure rule created in the above-mentioned manner. The countermeasure command is "OS reboot" and the priority is an initial value of "50" (step 208).

Thereafter, the status register 7 sets "without AP error" as information on a change of a running state to the countermeasure command and the command executor 4 executes the countermeasure command. Moreover, when "AP error" is avoided in the step 201 after execution of the countermeasure command, it is decided that the countermeasure command is effective so that the priority is increased. Thus, a failure countermeasure rule to be selected when the same failure occurs in the step 205 is created. When "AP error" is not avoided, the priority is decreased in a manner similar to that in the case of "AP reboot". Thus, a new rule corresponding to a countermeasure command in each of the No. 3 and the No. 4 failure countermeasure rules is created. Thus, the effect is decided.

According to the present embodiment, when a failure other than failures described in a failure countermeasure rule occurs in the service executor 11, a countermeasure command is selected from the rule storage 2 based on the countermeasure command selection information in the failure knowledge information having a failure state matching the produced failure. Thus, the countermeasure command is tried in the service executor 11. Compared with the failure recovery apparatus (FIG. 1) which is totally impotent when a failure other than failures described in a failure countermeasure rule, the present embodiment can improve the failure recovery rate and the system availability.

When the countermeasure command selected from the rule storage 2 is tried in the service executor 11 based on the countermeasure command selection information in the failure knowledge information having a failure state matching a failure generated in the service executor 11, a new failure countermeasure rule is created based the failure state, the countermeasure command and the priority of an initial value. The effect decider 8 decides the success or failure of a failure recovery by the countermeasure command. If the recovery of the failure is successful, the priority of the created failure countermeasure rule is increased. Therefore, when the same failure state occurs again, the failure countermeasure rule having the conditional expression corresponding to the failure state is executed preferentially, so that the same type of failure can be quickly recovered. Moreover, the burden of an administrator for creation of a rule is largely relieved so that the countermeasure error can be prevented.

As to the present embodiment, the operation has been explained of creating a new failure countermeasure rule and controlling the priority. However, the priority of an existing failure countermeasure rule including an executed countermeasure command may be controlled without creating a failure countermeasure rule. In this case, the priority cannot be controlled only for a new failure. However, the priority control, in which both the effect of the case matching the conditional expression and the effect of the case tried as a similar state are added, can be performed using an existing failure countermeasure rule. Thus, the execution order of failure countermeasure commands can be effectively decided according to an actual property, including an unknown failure, of the service executor.

The numerical value of a priority and the computational method, quoted according to the present embodiment, should not be limited only to the above-mentioned examples. If correction is carried out according to the execution result of the countermeasure command, the countermeasure can be effectively performed in a similar manner. Moreover, as to creation of a new rule, it may be considered that after all candidates for rules included in a related running state are created with an initial priority, the priority is changed based on the effect decision on and after the next time. Such a method may use an existing weighted-rule retrieving method. The method of trying correction sequentially according to countermeasure command execution results may obtain the same effect.

Moreover, by holding the creation of a new failure countermeasure rule until the effect decider 8 detects the success of recovery by the countermeasure command, only the countermeasure command to which an effect on a failure recovery has been verified may be executed.

Third Embodiment

Next, a third embodiment of the present invention will be explained below by referring to FIGS. 11 to 14.

Figure 11:
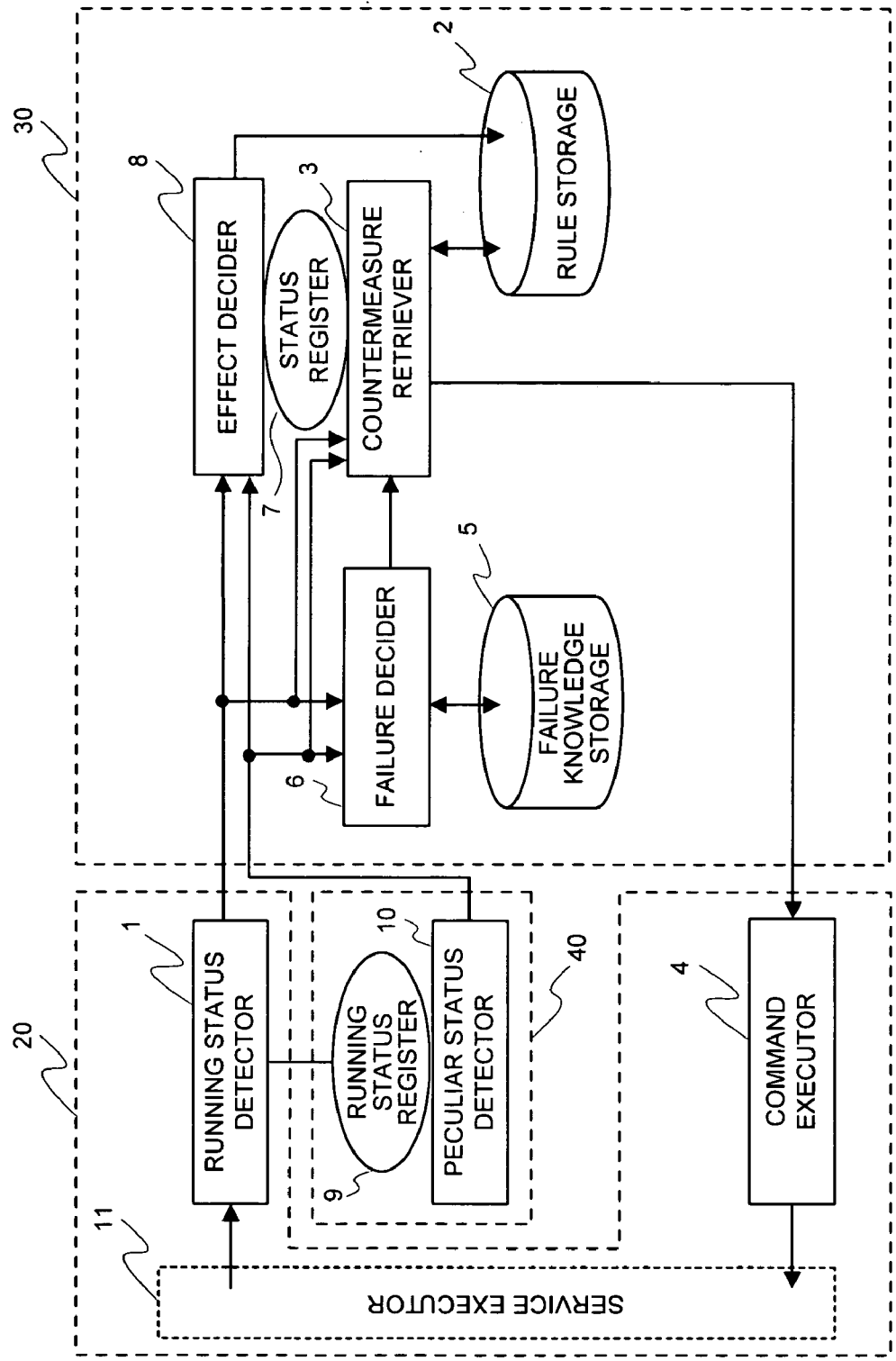
FIG. 11 is a block diagram showing the configurational example according to a third embodiment of the present invention.

Referring to FIG. 11, a failure recovery apparatus according to the third embodiment of the present invention includes an agent 20, a peculiar status detector 40, and a manager 30. The agent 20 includes a running status detector 1 and a command executor 4, each which is disposed on the side of the service executor 11. The peculiar status detector 40 includes a running status register 9 and a peculiar status detector 10. The manager 30 includes a rule storage 2, a countermeasure retriever 3, a failure knowledge storage 5, a failure decider 6, a status register 7, and an effect decider 8. Referring to FIG. 11, one agent 20 and one peculiar status detector 40 are connected to the manager 30. However, plural agents 20 and plural peculiar status detectors 40 may be connected to the manager 30.

In the agent 20 of FIG. 11, the service executor 11 and the command executor 4 are identical to those in the failure recovery apparatus according to the second embodiment of the present invention shown in FIG. 7. In the manager 30 of FIG. 11, the rule storage 2, the failure knowledge storage 5, and the status register 7 are identical to those in the failure recovery apparatus according to the second embodiment of the present invention shown in FIG. 7. In the agent 20, the running status detector 1 has the following functions. In the peculiar status detector 40, the running status register 9 and the peculiar status detector 10 have the following functions, respectively. In the manager 30, the countermeasure retriever 3, the effect decider 8, and the failure decider 6 have the following functions, respectively.

The running status detector 1 transmits the executed running state of the service executor 11 to the manager 30 and the running status register 9.

The running status register 9 is a storage that receives and stores the running state of the service executor 11 transmitted from the operations status detector 1. This storage has a capacity of storing the running state for a past fixed period.

The peculiar status detector 10 detects a peculiar state different from the normal running state of the service executor 11. The peculiar state indicates the state that is not detected in the normal running state of the service executor 11. In the peculiar state, for example, a range of load variation is stored every day of a week and a load deviated from the range is detected. As to a peculiar status deciding method, there is the method of extracting statistical outliers from among a large set of data, using the outlier computing device, disclosed, for example, in Japanese Patent Laid-open Publication No. 2004-078981, and estimating improper data or abnormal status as a peculiar state. The peculiar state thus detected cannot be clearly decided as failure but may be often used as a sign before an occurrence of a failure. In the present embodiment, as a peculiar status decision method is shown the method of analyzing a running state for a fixed period, computing a changing range of a running state in a normal state, and then deciding it as a peculiar state when a newly obtained running state is not in the changing range. Specifically, the peculiar status detector 10 analyzes a history of a running state recorded in the running status register 9 for a fixed period and computes a changing range of a running state in a normal running state. Meanwhile, when a peculiar state in which a current running state is deviated from the changing range is detected, the peculiar status detector 10 outputs the peculiar state information including a running state decided as a peculiar state and a normal changing range, to the failure decider 6.

The failure decider 6 receives peculiar state information transmitted from the peculiar status detector 10, creates new failure knowledge information, in which a running state decided as a peculiar state is a failure state, and then stores it into the failure knowledge storage 5. The countermeasure command selection information in the new failure knowledge information may be, for example, "ANY", which selects all countermeasure commands. However, the countermeasure command selection information may be the condition that selects part of countermeasure commands based on a detected peculiar state. For example, a peculiar state detected by the peculiar status detector 10 is defined as "outside CPU load range", in which the CPU load is in a peculiar state different from a normal state. The peculiar status detector 10 outputs to the failure decider 6 peculiar state information, including a running state decided as a peculiar state and a normal change range, from the peculiar status detector 10 when the outside of the CPU load range is detected, in the format of "peculiar status=outside of CPU load range, parameter=CPU load, normal range=. . . , current value (outlier)=. . . ". In this case, "CPU load" specified with parameters is defined as countermeasure command selection information.

The countermeasure retriever 3 receives peculiar state information detected by the peculiar status detector 10, in addition to the running state of the service executor 11 detected by the running status detector 1. If the rule storage 2 stores a failure countermeasure rule having a conditional expression matching the peculiar state information, in a manner similar to that of the running state, the countermeasure retriever 3 selectively outputs the failure countermeasure rule.

The effect decider 8 receives the peculiar state information detected by the peculiar status detector 10, in addition to the running state of the service executor 11 after execution of the countermeasure command detected by the running state detector 1. Then, the effect decider 8 decides the effect of the countermeasure command tried to eliminate the peculiar state.

Figure 12:
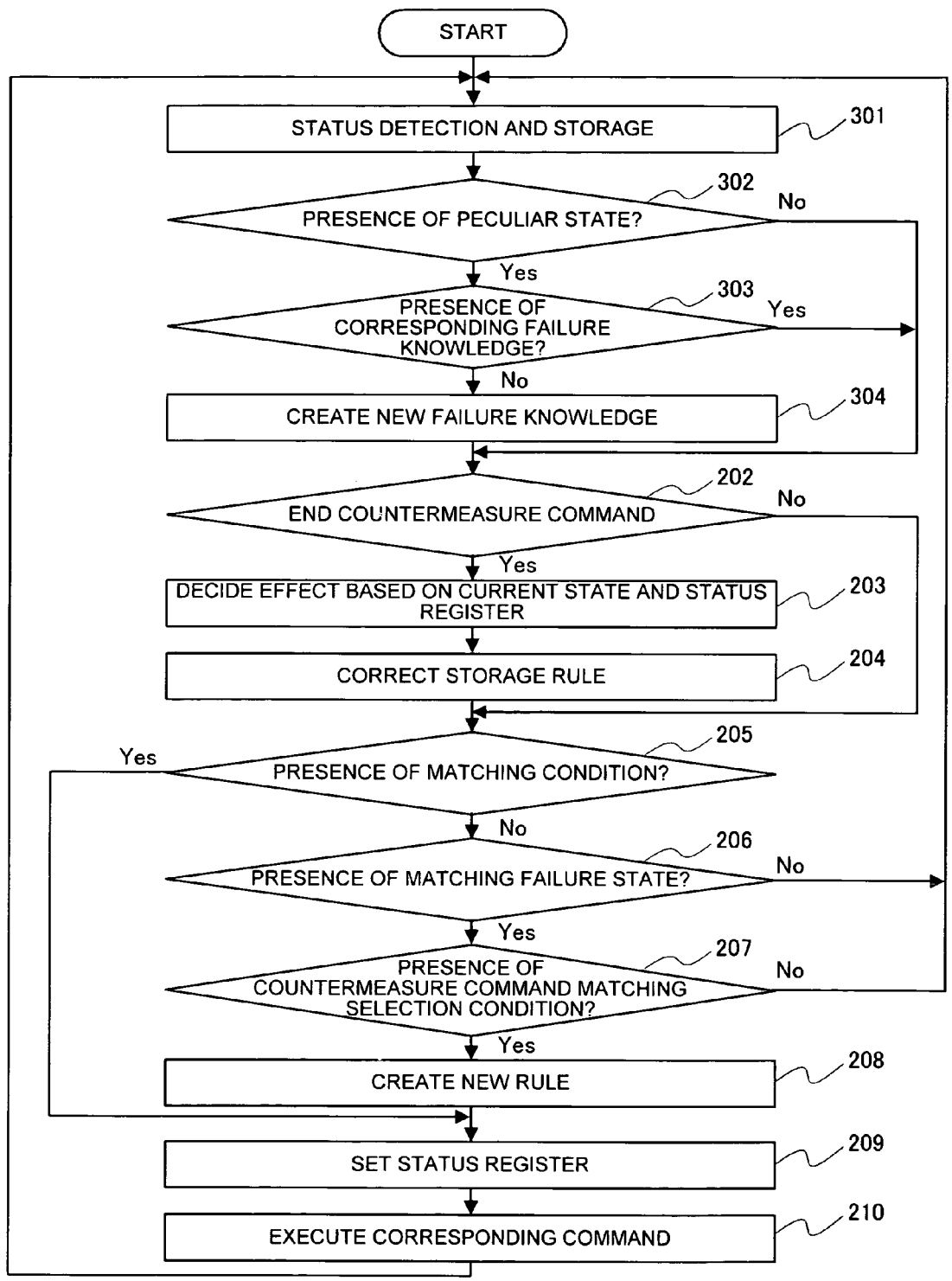
FIG. 12 is a flowchart showing the operation according to the third embodiment of the present invention.

FIG. 12 is a flowchart showing an operation of a failure recovery apparatus according to the present embodiment. The operation of the present embodiment will be explained below. In this example, there are in an initial state the failure countermeasure rule as shown in FIG. 10 and the failure knowledge information as shown in FIG. 5, in a manner similar to that in the second embodiment.

The running status detector 1 detects the running state of the service executor 11 and stores a current running state into the running status register 9 (step 301 in FIG. 12). The peculiar status detector 10 refers to the running status register 9 and decides whether or not the current running state is a peculiar state (step 302). In this case, the peculiar status detector 10 computes a changing range of a normal operation by referring to the history of a running state for a fixed time period stored in the running status register 9. Moreover, when a current running state is within the changing range, it is regarded as a normal status so that any operation is not performed. When the current running state is outside the changing range, it is regarded as a peculiar state so that the peculiar state information is output. For example, because a peculiar state deviated from the normal CPU load range is found, it is regarded that peculiar state information on "outside CPU load range", including a CPU load value in a peculiar state and a normal range of the CPU load, has been output.

The failure decider 6 receives peculiar state information output from the peculiar status detector 10 and retrieves whether or not there is the failure knowledge information, in which a failure state matches the peculiar state, in sets of failure knowledge information stored in the failure knowledge storage 5 (step 303). Because the failure knowledge information shown in FIG. 5 does not include "outside CPU load range", the failure decider 6 creates new failure knowledge information (step 304). In such a manner, the failure knowledge information of No. 3 in the failure knowledge information group 502 shown in FIG. 13 is created. "Outside CPU load range" is set as a failure state and "CPU load" is set as countermeasure command selection information.

Thereafter, the process is performed similar to the steps 202 to 210 in the flow chart (FIG. 8) showing the operation of the second embodiment. As a result, the failure decider 6 derives the failure knowledge information of No. 3 (FIG. 13) newly created in the step 206, from the failure knowledge storage 5. Next, the countermeasure retriever 3 first selects the countermeasure command, "OS reboot" in the failure countermeasure rules of No. 3 having the highest priority of the failure countermeasure rules of No. 3 and No. 4 including a CPU load in the conditional expression, in the failure countermeasure rule group (FIG. 10), based on the countermeasure command selection information, "CPU load" in the failure knowledge information. Thus, the countermeasure retriever 3 outputs the "OS reboot" to the command executor 4 and the service executor 11 executes it (steps 207 and 210). Moreover, the countermeasure retriever 3 creates a new failure countermeasure rule of No. 7 (FIG. 14) and thus stores it into the rule storage 2 (step 208). In the new failure countermeasure rule, the conditional expression is "outside CPU load range", the countermeasure command is "AP reboot", and the priority is an initial state of "50". "Elimination of peculiar status outside CPU load range" is set as information, of which its change is expected after execution of the countermeasure command, to the status register 7 (step 209).

Returning to the step 301, the running status detector 1 detects the running state after execution of the countermeasure command and the peculiar status detector 10 detects the presence or absence of a peculiar state. If the peculiar state outside the CPU load range is eliminated, the effect decider 8 detects the event (step 203). The priority of the previously created failure countermeasure rule of No. 7 (FIG. 14) becomes 60, incremented, for example, by 10 (step 204). Since the "outside CPU load range" is not detected any more, the countermeasure command in the failure countermeasure rule of No. 3 is not executed and a new failure countermeasure rule is not created according to the execution.

In the failure recovery apparatus of the present embodiment as described above, the failure decider 6 creates new failure knowledge information according to the peculiar state detected by the peculiar status detector 10 and the countermeasure retriever 3 creates a new failure countermeasure rule. Moreover, the effect decider 8 corrects the failure countermeasure rule such that a failure countermeasure rule effective on the service executor 11 is executed preferably. By doing so, even if a state being regarded as a failure is not previously specified, necessary failure knowledge information and a failure countermeasure rule can be automatically created based on the state detected as a peculiar state. Thus, the burden of an administrator is largely alleviated while the service reliability increases effectively over the continuous operation.

Fourth Embodiment

A fourth embodiment of the present invention will be explained below by referring to FIGS. 15 to 17.

Figure 15:
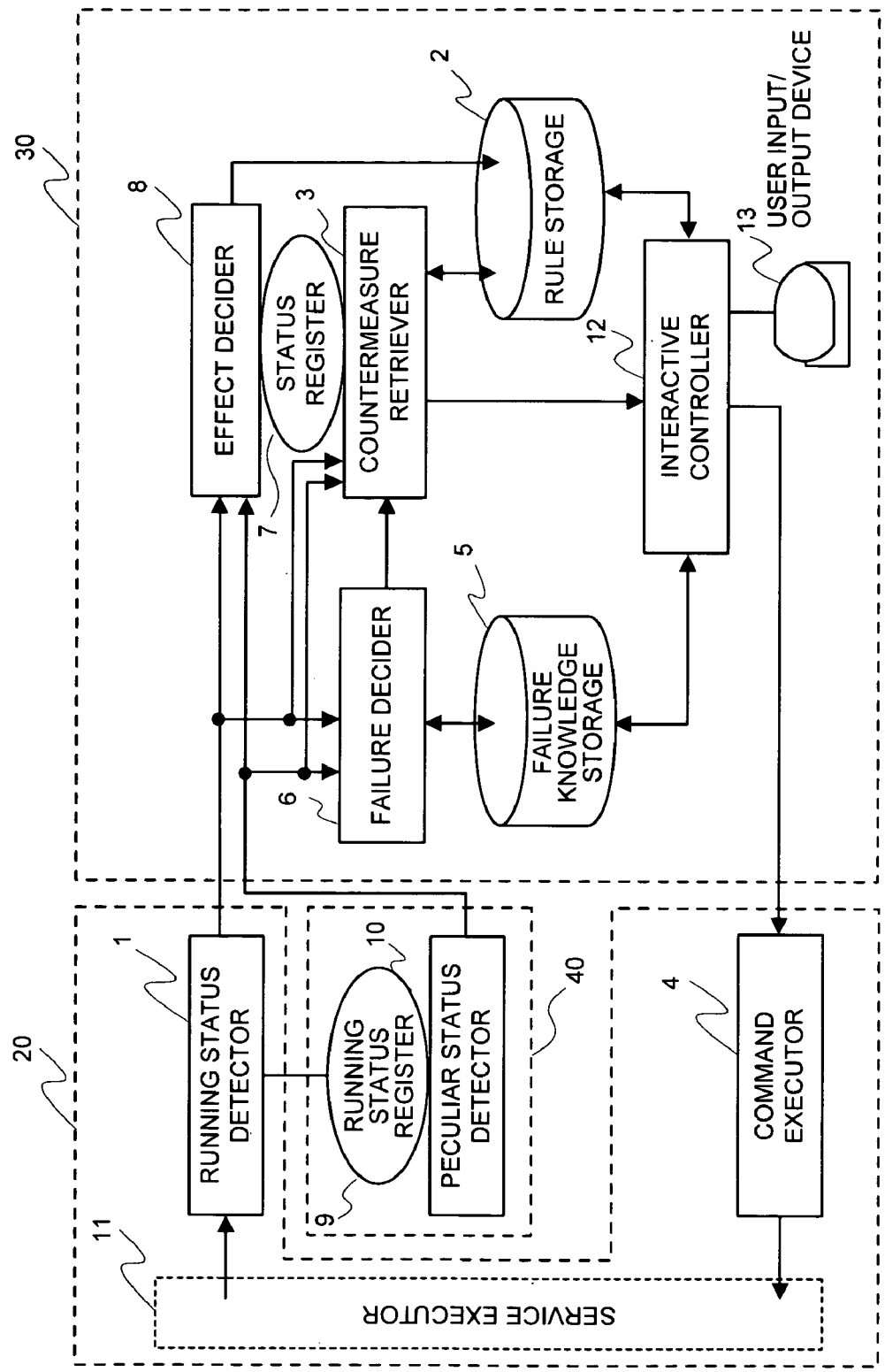
FIG. 15 is a block diagram showing the configurational example according to a fourth embodiment of the present invention.

Referring to FIG. 15, the failure recovery apparatus according to the fourth embodiment of the present invention consists of an agent 20, a peculiar status detector 40, and a manager 30. The agent 20 includes a running status detector 1 and a command executor 4, each which is disposed on the side of the service executor 11. The peculiar status detector 40 includes a running status register 9 and a peculiar status detector 10. The manager 30 includes a rule storage 2, a countermeasure retriever 3, a failure knowledge storage 5, a failure decider 6, a status register 7, an effect decider 8, an interactive controller 12, and a user input/output device 13. Referring to FIG. 15, one agent 20 and one peculiar status detector 40 are connected to the manager 30. However, plural agents 20 and plural peculiar status detectors 40 may be connected to the manager 30.

In the agent 20 of FIG. 15, the service executor 11 and the running status detector 1 and the command executor 4 are identical to those in the failure recovery apparatus according to the third embodiment shown in FIG. 11. In the peculiar status detector 40, the running status register 9 and the peculiar status detector 10 are identical to those in the failure recovery apparatus according to the third embodiment shown in FIG. 11. In the manager 30, the rule storage 2, the failure knowledge storage 5, the failure decider 6, the status register 7 and the effect decider 8 are identical to those in the failure recovery apparatus according to the third embodiment shown in FIG. 11. In the manager 30, the interactive controller 12, the user input/output device 13, and the countermeasure retriever 3 have the following functions, respectively.

The countermeasure retriever 3 has the function of the countermeasure retriever 3 in the third embodiment shown in FIG. 11. Moreover, when a failure countermeasure rule according to the failure knowledge information is created or the priority is changed, the countermeasure retriever 3 outputs the information on a change of the failure countermeasure rule to the interactive controller 12. Moreover, when the failure decider 6 receives new failure knowledge information created according to the peculiar state information and decides a countermeasure command, the countermeasure retriever 3 outputs information on a failure countermeasure rule, including the failure knowledge information and the countermeasure command, to the interactive controller 12.

The user input/output device 13 consists of a display such as a liquid display and an input device such as a keyboard or mouse.

The interactive controller 12 receives failure knowledge information from the countermeasure retriever 3 and information such as a failure countermeasure rule and indicates them to a user on the user input/output device 13. The interactive controller 12 also corrects, through the interactive manipulation by a user, the failure knowledge information stored in the failure knowledge storage 5 or the failure countermeasure rule stored in the rule storage 2. The interactive controller 12 also decides whether or not a countermeasure command outputs from the countermeasure retriever 3 to the command executor 4, based on the inputting of an approval of execution by a user.

Figure 16:
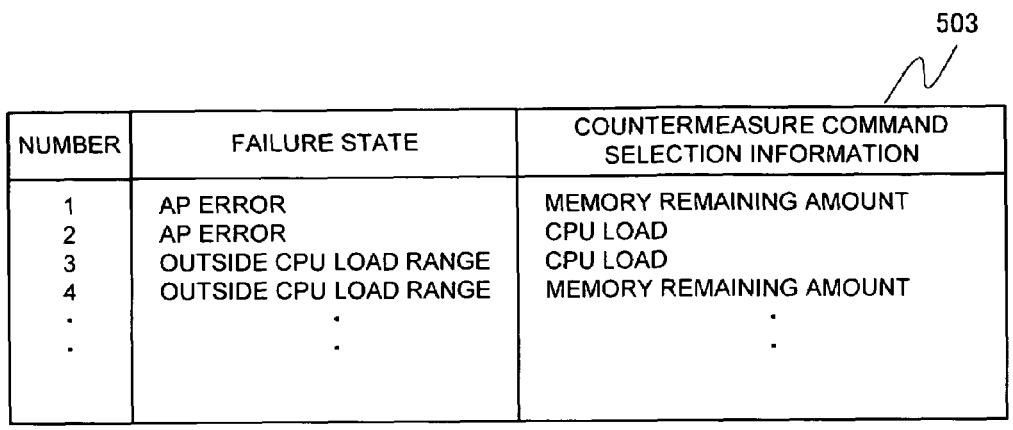
FIG. 16 is a diagram showing an example of a change of failure knowledge information according to the fourth embodiment of the present invention.
Figure 17:
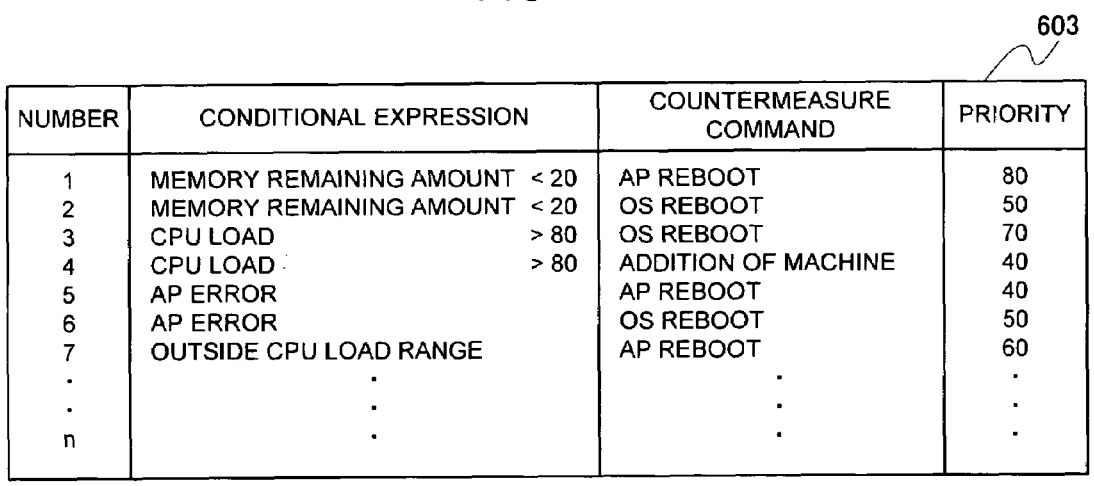
FIG. 17 is a diagram illustrating a change of a failure countermeasure rule according to the fourth embodiment of the present invention.

FIG. 16 is a diagram showing a variation of failure knowledge information according to the present embodiment and FIG. 17 is a diagram showing a variation of a failure countermeasure rule according to the present embodiment. In the failure knowledge information group 503 in FIG. 16, the failure knowledge information of No. 4, in which the failure state is "outside CPU load range" and the countermeasure command selection information is "memory remaining amount", is added to the failure knowledge information group 502 in FIG. 13. In the failure countermeasure rule group 603 in FIG. 17, the failure countermeasure rule of No. 7, in which the conditional expression is "outside CPU load range" and the countermeasure command is "AP reboot" and the priority is "60", is added to the failure countermeasure rule information group 602 in FIG. 10.

The operation of the failure recovery apparatus of the present embodiment will be explained below by referring to FIGS. 15, 16 and 17. Likewise the third embodiment, it is assumed, in an initial state, that the rule storage 2 stores in the failure countermeasure rule shown in FIG. 10 and the failure knowledge storage 5 stores the failure knowledge information shown in FIG. 13.

As to the operation explained in the third embodiment, when the failure decider 6 creates and outputs the failure knowledge information of No. 3 (FIG. 13), the countermeasure retriever 3 selects the countermeasure command in the failure countermeasure rule of No. 3 and the countermeasure command in the failure countermeasure rule of No. 4 (FIG. 10), based on the countermeasure command selection information, "CPU load", and tries to create new failure countermeasure rules having the selected countermeasure commands (step 208 in FIG. 12). At this time, the countermeasure retriever 3 outputs to the interactive controller 12 the created failure knowledge information and the information on the failure countermeasure rules of Nos. 3 and 4 respectively including the selected countermeasure commands.

The interactive controller 12 receives these sets of information and the user input/output device 13 shows them to the user. Thus, the user can recognize that what is a detected peculiar state and what is failure knowledge information created according to the peculiar state and what is a failure countermeasure rule created based on the failure knowledge information. For example, when the user (administrator) notices that "outside CPU load range" detected as peculiar information may be caused by an insufficient memory, the interactive controller 12 can correct the failure knowledge information in the failure knowledge storage 5 through the interactive controller 12, based on the instruction from the user input/output device 13.

FIG. 16 shows an example of failure knowledge information corrected thus. The failure knowledge information of No. 4, in which countermeasure command selection information is expressed as "memory remaining amount", is added, together with the No. 3 rule added by the failure decider 6. Thereafter, a series of operations are performed. That is, the failure decider 6 outputs "CPU load" and "memory remaining amount" as the countermeasure command selection information to "outside CPU load range" in a current failure state. The countermeasure retriever 3 selects countermeasure commands in the failure countermeasure rules of No. 1 to No. 4 in FIG. 10, based on the countermeasure command selection information, and then creates and tries a new failure countermeasure rule having the selected countermeasure command. Then, the effect decider 8 decides the effect so that the priority of a failure countermeasure rule effective on the service executor 11 is increased.

Similarly, the user may correct the failure countermeasure rule. For example, when a user (administrator) notices that there is the possibility that "outside CPU load range" is recovered due to "AP reboot", the failure countermeasure rule in the rule storage 2 can be corrected through the interactive controller 12, based on the instruction from the user input/output device 13. Referring to FIG. 17, No. 7 represents the thus-added failure countermeasure rule. In this case, the countermeasure retriever 3 detects the existence of a failure countermeasure rule, in which the priority corresponding to a failure state, "outside CPU load range", is over an initial value. Then, the countermeasure command, "AP reboot" is executed. Thereafter, when the effect decider 8 detects "outside CPU load range", the priority of the failure countermeasure rule increases. This rule is applied to subsequent failures.

Moreover, when a newly created failure countermeasure rule is tried, the countermeasure retriever 3 outputs it to the interactive controller 12. The interactive controller 12 manifests the information to the user on the user input/output device 13 and receives an execution approval input through the interactive operation by the user. When the approval from the user is obtained, a countermeasure command is output to the command executor 4. When the approval from user is not obtained, a countermeasure command is not output to the command executor 4. The effect decider 8 decides that the countermeasure command not be executed is ineffective. Thus, the priority thereof decreases, so that the countermeasure command is not selected in the following steps. In this case, because no execution of a countermeasure command is decided through the intention of a user, in addition to the execution result thereof, the priority decreases.

In the failure recovery apparatus according to the fourth embodiment of the present invention described above, the interactive controller 12 can present to the user the new failure knowledge information created by the failure decider 6 according to the peculiar state information, or a new failure countermeasure rule created by the countermeasure retriever 3 according to the failure knowledge information and the effect decision result. Moreover, failure knowledge information or a failure countermeasure rule can be corrected through the user operation. By doing so, the user can grasp and correct, if necessary, the state where the failure recovery apparatus automatically executes a failure countermeasure. Moreover, the failure recovery apparatus can execute a new failure countermeasure to which the correction is introduced. The user can obtain and verify the know-how necessary for management through the behavior of the system. Moreover, the interactive controller 12 can execute only the countermeasure command, which is approved for execution through the interaction to the user. The effect decider 8 lowers the priority of the countermeasure command, which is not approved for execution. Thus, the priority of a failure countermeasure rule can be controlled as the quality of countermeasure having the intention of an administrator, in addition to the execution result of a countermeasure command.

The embodiments of the present invention have been explained above. However, the present invention should not be limited only to the above-mentioned embodiments. Various other additions and modifications of the present invention are possible. The functions of the manager and the agent, constructing a failure recovery apparatus according to the present invention, can be realized in hardware or can be realized using a computer and a program. The program is recorded on a computer readable recording medium, such as a magnetic disc or a semiconductor memory, and is read in by the computer at a computer start-up time. Thus, the program controls the operation of the computer in such a way that the computer functions as the manager and the agent in each embodiment.

What is claimed is:

1. A failure recovery apparatus comprising:
   a rule storage for storing a failure countermeasure rule which describes a failure type and a countermeasure command corresponding to said failure type; and
   a failure knowledge storage for storing failure knowledge information, which describes a failure type and countermeasure command selection information;
   wherein when a failure occurring in a service executor matches a failure described in said failure countermeasure rule in said rule storage, a countermeasure command in a matched failure countermeasure rule is read out of said rule storage and is executed on said service executor;
   wherein when there is not a match, it is decided whether or not a failure occurring in said service executor matches a failure described in failure knowledge information in said failure knowledge storage;
   wherein when there is a match, a countermeasure command is selected from said rule storage based on countermeasure command selection information corresponding to the matched failure knowledge information and is executed on said service executor.

2. The failure recovery apparatus defined in claim 1, further comprising:
   means for creating a failure countermeasure rule and adding said failure countermeasure rule into said rule storage, said failure countermeasure rule describing a failure type described in said failure knowledge information and a countermeasure command selected from said rule storage based on said countermeasure command selection information;
   wherein when a failure of the same type occurs again, said failure is dealt with according to said failure countermeasure rule stored in said rule storage.

3. A failure recovery apparatus comprising:
   a rule storage for storing a failure countermeasure rule containing a conditional expression for decision of a failure type and a countermeasure command;
   a failure knowledge storage for storing failure knowledge information containing a failure state and countermeasure command selection information;
   a running status detector for detecting a running state of a service executor;
   a failure decider for retrieving failure knowledge information from said failure knowledge storage, said failure knowledge information containing a failure state matching a running state detected by said running status detector;
   a countermeasure retriever for retrieving, from said rule storage, a failure countermeasure rule containing a conditional expression matching a running state detected by said running status detector and outputting a countermeasure command in a failure countermeasure rule obtained through retrieval when said retrieval is successful or selectively outputting a countermeasure command from said failure countermeasure rule in said rule storage based on a countermeasure command selection information in said failure knowledge information when there is failure knowledge information retrieved by said failure decider in failure of said retrieval; and
   a command executor for receiving a countermeasure command from said countermeasure retriever and executing said countermeasure command on said service executor.

4. The failure recovery apparatus defined in claim 3, wherein countermeasure command selection information in said failure knowledge information contains a parameter related to a failure state in said failure knowledge information of parameters appearing in a conditional expression in a failure countermeasure rule stored in said rule storage; and
   wherein said countermeasure retriever selects a countermeasure command in a failure countermeasure rule, in which a conditional expression contains a parameter described in countermeasure command selection information.

5. The failure recovery apparatus defined in claim 3, further comprising an effect decider for deciding a success or failure of recovery based on said executed countermeasure command and changing said priority information according to the decision result;
   wherein said rule storage stores priority information on an application order of failure countermeasure rules; and
   wherein said countermeasure retriever sequentially selectively outputs said countermeasure commands based on said priority information until said failure recovers when plural countermeasure commands selected by said countermeasure command selection information exist.

6. The failure recovery apparatus defined in claim 3, wherein said countermeasure retriever creates a failure countermeasure rule and adding said failure countermeasure rule to said rule storage, said failure countermeasure rule describing a failure state described in said failure knowledge information and a countermeasure command selected from said rule storage based on said countermeasure command selection information;

wherein when the same failure state occurs again, said failure is dealt with according to said failure countermeasure rule stored in said rule storage.

7. The failure recovery apparatus defined in claim 6, further comprising an interactive controller for outputting a failure countermeasure rule created by said countermeasure retriever and an effect decision result thereof, to a user input/output device, according to said failure knowledge information, and correcting a failure countermeasure rule stored in said rule storage and failure knowledge information stored in said failure knowledge storage, according to an input from said user input/output device.

8. The failure recovery apparatus defined in claim 3, further comprising a peculiar status detector for detecting a peculiar state of said service executor based on a history of a running state detected by said running status detector and outputting peculiar state information;

wherein said failure decider receives said peculiar state information and creates failure knowledge information, including a failure state and countermeasure command selection information, and stores said failure knowledge information into said failure knowledge storage, said peculiar state including a failure state, said failure state being said peculiar state, said countermeasure command selection information being a parameter related to said peculiar state among parameters contained in a conditional expression in a failure countermeasure rule stored in said rule storage.

9. The failure recovery apparatus defined in claim 8, further comprising an interactive controller for outputting a failure countermeasure rule to a user input/output device, said failure countermeasure rule including failure knowledge information created by said failure decider according to said peculiar state information and a countermeasure command selected from said rule storage by said countermeasure retriever according to said failure knowledge information, and correcting a failure countermeasure rule stored in said rule storage and failure knowledge information stored in said failure knowledge storage according to an input from said user input/output device.

10. The failure recovery apparatus defined in claim 3, further comprising an interactive controller, disposed between said countermeasure retriever and said command executor, for inquiring from a user go or no-go of execution of a countermeasure command selectively output by said countermeasure retriever through a user input/output device, based on countermeasure command selection information of said failure knowledge information.

11. A failure recovery method comprising the steps of:

using a rule storage for storing a failure countermeasure rule describing a type of failure and a countermeasure command against the type of failure and a failure knowledge storage for storing failure knowledge information describing a type of failure and countermeasure command selection information;

when a failure occurring in a service executor matches a failure described in a failure countermeasure rule stored in said rule storage, reading a countermeasure command corresponding to a matched failure countermeasure rule from said rule storage and executing said command on said service executor;

when there is no match, deciding whether or not a failure occurring in said service executor matches a failure described to said failure knowledge information in said failure knowledge storage; and when there is a match, selecting a countermeasure command from said rule storage based on countermeasure command selection information of said matched failure knowledge information and executing said countermeasure command on said service executor.

12. The failure recovery method defined in claim 11, wherein said countermeasure retriever creates a failure countermeasure rule, said failure countermeasure rule describing a type of failure described in said failure knowledge information and a countermeasure command selected from said rule storage based on said countermeasure command selection information and adds said countermeasure command rule to said rule storage;

whereby when a failure of the same type occurs again, countermeasure is performed according to said failure countermeasure rule stored in said rule storage.

13. A failure recovery method comprising the steps of:

a) detecting a running state of a service executor, using a running status detector;

b) retrieving failure knowledge information including a failure state matching said detected running state from a failure knowledge storage, which stores failure knowledge information including a failure state and countermeasure command selection information, using a failure decider;

c) when said detected running state matches a conditional expression described in any failure countermeasure rule in a rule storage storing failure countermeasure rules including a failure decision conditional expression and a countermeasure command, outputting a countermeasure command of a matched failure countermeasure rule, using said countermeasure retriever, or when there is no match and there is failure knowledge information retrieved in the step (b), outputting a countermeasure command selected from a failure countermeasure rule in said rule storage based on countermeasure command selection information in the failure knowledge information; and d) receiving said output countermeasure command using a command executor and then executing said countermeasure command on said service executor.

14. The failure recovery method defined in claim 13, wherein countermeasure command selection information in said failure knowledge information includes a parameter related to a failure state in said failure knowledge information among parameters appearing in a conditional expression in a failure countermeasure rule stored in said rule storage and wherein a countermeasure command in a failure countermeasure rule including a conditional expression having parameters described in countermeasure command selection information is selected in the step (c).

15. The failure recovery method defined in claim 13, further comprising the step of:

e) deciding a success or failure of recovery by said executed countermeasure command, using an effect decider, and changing said priority information according to the decision result;

wherein said rule storage stores priority information on an application order of failure countermeasures rules;

wherein said countermeasures commands outputs sequentially and selectively based on said priority information until recovery of said failure when plural countermeasure commands selectable with said countermeasure command selection information exists in said step (c).

16. The failure recovery method defined in claim 13, further comprising the step of:
   f) creating a failure countermeasure rule using said countermeasure retriever, said failure countermeasure rule describing a failure state described in said failure knowledge information and a countermeasure command selected from said rule storage based on said countermeasure command selection information; and
   adding said failure countermeasure rule to said rule storage;
   whereby when the same failure state occurs again, said failure is dealt with according to said failure countermeasure rule stored in said rule storage.

17. The failure recovery method defined in claim 16, comprising the steps of, by means of an interactive controller,
   outputting a failure countermeasure rule created by said countermeasure retriever according to said failure knowledge information and the effect decision result to a user input/output device, using an interactive controller; and
   correcting a failure countermeasure rule stored in said rule storage and failure knowledge information stored in said failure knowledge storage, according to an input from said user input/output device.

18. The failure recovery method defined claim 13, further comprising the steps of:
   g) detecting a peculiar state of said service executor based on a history of said detected running state, by means of a peculiar status detector, and then outputting peculiar state information; and
   h) receiving said peculiar state information using said failure decider and creating failure knowledge information, said failure knowledge information including a failure state being said peculiar state and countermeasure command selection information being a parameter related to said peculiar state among parameters appearing in a conditional expression in a failure countermeasure rule stored in said rule storage, and then storing said failure knowledge information into said failure knowledge storage.

19. The failure recovery method defined in claim 18, further comprising the steps of, by means of an interactive controller,:
   outputting a failure countermeasure rule to a user input/output device, said failure countermeasure rule including failure knowledge information created by said failure decider based on said peculiar state information and a countermeasure command selected from said rule storage by said countermeasure retriever based on said failure knowledge information; and
   correcting a failure countermeasure rule stored in said rule storage and failure knowledge information stored in said failure knowledge storage, according to an input from said user input/output device.

20. The failure recovery method defined in claim 13, further comprising the step of: inquiring, of a user through a user input/output device, whether or not an interactive controller disposed between said countermeasure retriever and said command executor can execute a countermeasure command selectively output by means of said countermeasure retriever based on countermeasure command selection information in said failure knowledge information.

21. A manager comprising:
   a rule storage for storing a failure countermeasure rule, which includes a conditional expression for failure decision and a countermeasure command;
   a failure knowledge storage for storing failure knowledge information, which includes a failure state and countermeasure command selection information;
   a running status detector for detecting a running state of a service executor;
   a failure decider for retrieving failure knowledge information from said failure knowledge storage, said failure knowledge information including a failure state matching a running state detected by said running status detector;
   a countermeasure retriever for retrieving a failure countermeasure rule including a conditional expression matching a running state detected by said running status detector, from said rule storage, and outputting, when said retrieval is successful, a countermeasure command in a failure countermeasure rule obtained through retrieval, or selectively outputting, when said retrieval is not successful, a countermeasure command from a failure countermeasure rule in said rule storage based on countermeasure command selection information in the failure knowledge information, provided that there is failure knowledge information retrieved by said failure decider; and
   a command executor for receiving a countermeasure command from said countermeasure retriever and executing said countermeasure command on said service executor.

22. The manager defined in claim 21, wherein countermeasure command selection information in said failure knowledge information includes a parameter related to a failure state in said failure knowledge information among parameters appearing in a conditional expression in a failure countermeasure rule stored in said rule storage; and wherein said countermeasure retriever selects a countermeasure command in a failure countermeasure rule including a parameter described in countermeasure command selection information in a conditional expression.

23. The manager defined claim 21 or 22, further comprising:
   an effect decider for deciding a success or failure of recovery by said executed countermeasure command and changing said priority information according to the decision result;
   wherein said rule storage stores priority information on an application order of failure countermeasure rules; and
   wherein said countermeasure retriever outputs said countermeasure command selectively and sequentially based on said priority information until said failure recovers when plurality countermeasure commands to be selected with said countermeasure command selection information exist.

24. The manager defined in claim 21, wherein said countermeasure retriever creates a failure countermeasure rule, which describes a failure state described in said failure knowledge information and a countermeasure command selected from said rule storage based on said countermeasure command selection information, and adds said failure countermeasure rule to said rule storage, and deals with said failure according to said failure countermeasure rule stored in said rule storage when the same failure state occurs again.

25. The manager defined in claim 24, further comprising an interactive controller for outputting a failure countermeasure rule created by said countermeasure retriever according to said failure knowledge information and the effect decision result thereof to a user input/output device and correcting a failure countermeasure rule stored in said rule storage according to an input from said user input/output device and failure knowledge information stored in said failure knowledge storage.

26. The manager defined in claim 21, further comprising:
a peculiar status detector for detecting a peculiar state of said service executor from a running state history detected by said running status detector and then outputting peculiar state information;
wherein said failure decider receives said peculiar state information and creates failure knowledge information, said failure knowledge information including said peculiar state being a failure state and a parameter related to said peculiar state among parameters included in a conditional expression in a failure countermeasure rule stored in said rule storage, being countermeasure command selection information, and stores said failure knowledge information into said failure knowledge storage.

27. The manager defined in claim 26, further comprising an interactive controller for outputting a failure countermeasure rule to a user input/output device, said failure countermeasure rule including failure knowledge information created by said failure decider based on said peculiar state information and a countermeasure command selected from said rule storage by said countermeasure retriever based on said failure knowledge information and correcting a failure countermeasure rule stored in said rule storage and failure knowledge information stored in said failure knowledge storage according to an input from said user input/output device.

28. The manager defined in claim 21, further comprising:
an interactive controller disposed between said countermeasure retriever and said command executor, for inquiring of a user through a user input/output device the go or no-go of a countermeasure command selectively output from said countermeasure retriever based on countermeasure command selection information in said failure knowledge information.

29. A computer readable medium containing a computer program, which when executed, controls a computer as a manager, which includes a failure decider and a countermeasure retriever;
said failure decider for retrieving failure knowledge information from a failure knowledge storage, said failure knowledge information including a failure state matching a running state detected by said running status detector which detects a running state of a service executor, said failure knowledge storage storing failure knowledge information including a failure state and countermeasure command selection information; and
wherein when a running state detected by said running status detector matches a conditional expression described in any failure countermeasure rule in a rule storage storing a failure countermeasure rule including a conditional expression for failure decision and a countermeasure command, said countermeasure retriever outputs a countermeasure command in a failure countermeasure rule to a command executor executing a command on said service executor;
wherein when there is no match, said countermeasure retriever outputs a countermeasure command selected from a failure countermeasure rule in said rule storage to said command executor based on countermeasure command selection information in the failure knowledge information, provided that there is failure knowledge information retrieved by said failure decider.

* * * * *